United States Patent [19]
Murano et al.

[11] Patent Number: 5,272,490
[45] Date of Patent: Dec. 21, 1993

[54] IMAGE FORMING APPARATUS WITH DRIVING CIRCUIT ELEMENTS AT ENDS OF AN LED ARRAY SIMULTANEOUSLY TRANSMITTING SUPPLIED DATA IN OPPOSING DIRECTIONS AND SIMULTANEOUSLY DRIVING THE SAME BLOCK OF LEDS

[75] Inventors: Shunji Murano, Aira; Yuuji Kurazono; Toshihiro Anzaki, both of Kokubu, all of Japan

[73] Assignee: Kyocera Corporation, Kyoto, Japan

[21] Appl. No.: 606,886

[22] Filed: Oct. 30, 1990

[30] Foreign Application Priority Data
Oct. 31, 1989 [JP] Japan ................................. 1-285429
Nov. 28, 1989 [JP] Japan ................................. 1-308265

[51] Int. Cl.$^5$ ...................... G01D 15/14; G01D 15/24
[52] U.S. Cl. .................. 346/107 R; 346/154
[58] Field of Search .................. 346/107 R, 154, 160, 346/76 PH, 108

[56] References Cited
U.S. PATENT DOCUMENTS

| | | | |
|---|---|---|---|
| 4,141,018 | 2/1979 | Mizuguchi et al. | 346/154 X |
| 4,524,372 | 6/1985 | De Cock et al. | 346/160 |
| 4,689,694 | 8/1987 | Yoshida | 346/107 R X |
| 4,750,010 | 6/1988 | Ayers et al. | 346/107 R |
| 4,807,047 | 2/1989 | Sato et al. | 346/107 R X |
| 4,967,192 | 10/1990 | Hirane et al. | 346/107 R X |

*Primary Examiner*—Benjamin R. Fuller
*Assistant Examiner*—David Yockey
*Attorney, Agent, or Firm*—Spensley Horn Jubas & Lubitz

[57] ABSTRACT

In a light emitting diode printing head provided with a plurality of LED arrays on which a plurality of LEDs are formed, a prior art driving circuit element is connected to each LED array. One or a plurality of driving circuit elements is disposed at least one end of the plurality of LED arrays, each LED array is sequentially connected by snaky individual signal lines, and the transmitting direction of printing data into a driving circuit element is alternately changed between one direction and another, inverted direction.

4 Claims, 31 Drawing Sheets

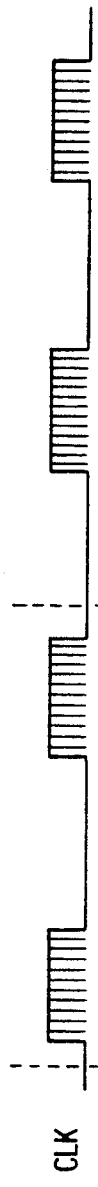
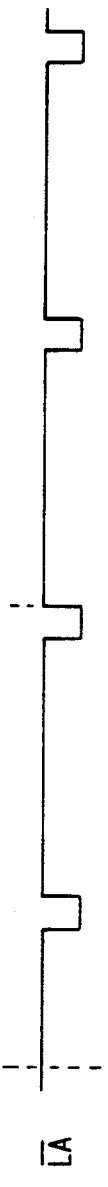
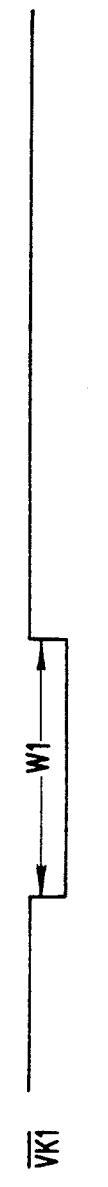
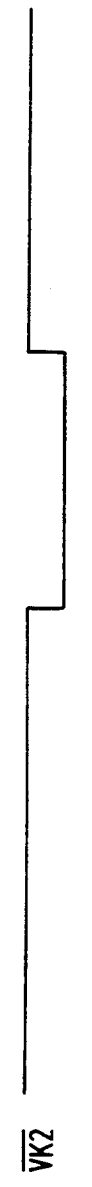

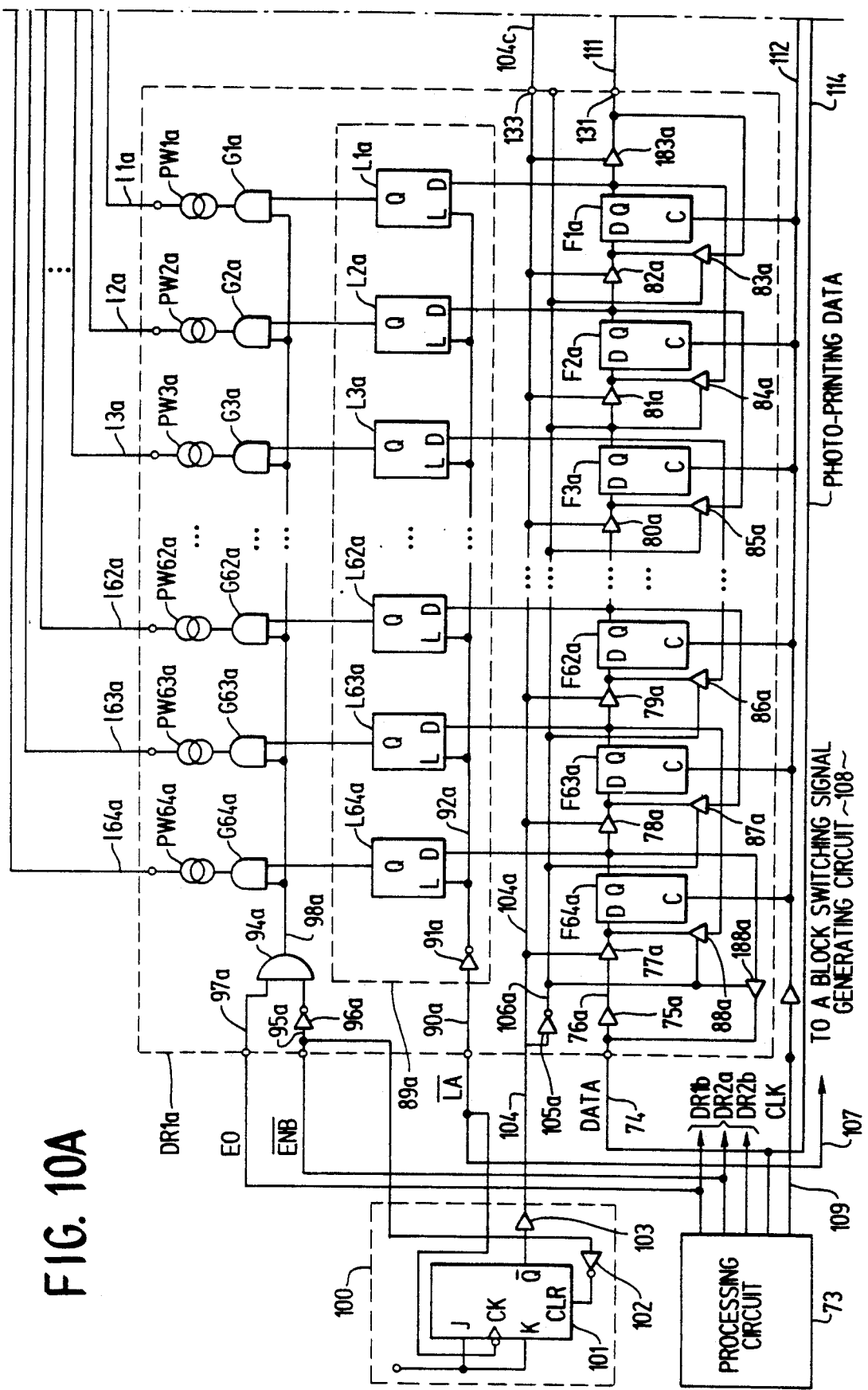

FIG. 11A  ENB
FIG. 11B  Q̄
FIG. 11C  DA
FIG. 11D  CLK
FIG. 11E  L̄A
FIG. 11F  V̄K1
FIG. 11G  V̄K2
FIG. 11H  V̄K3
ONE DIRECTION
INVERTED DIRECTION
W1
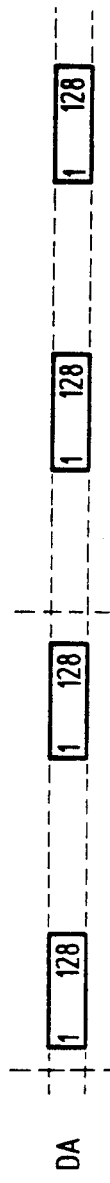
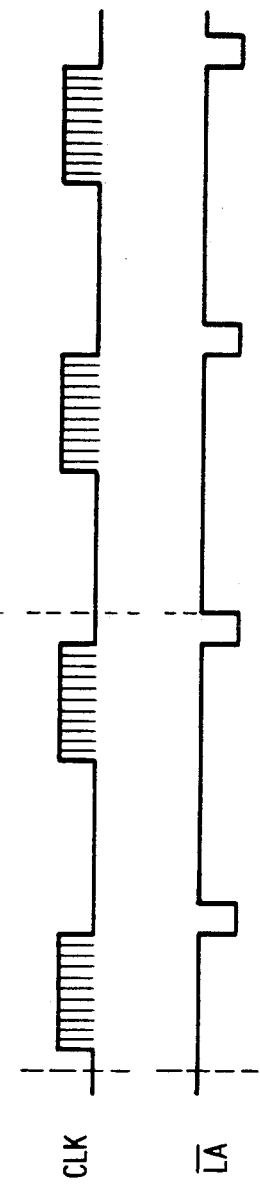
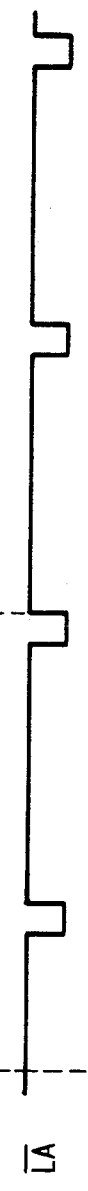

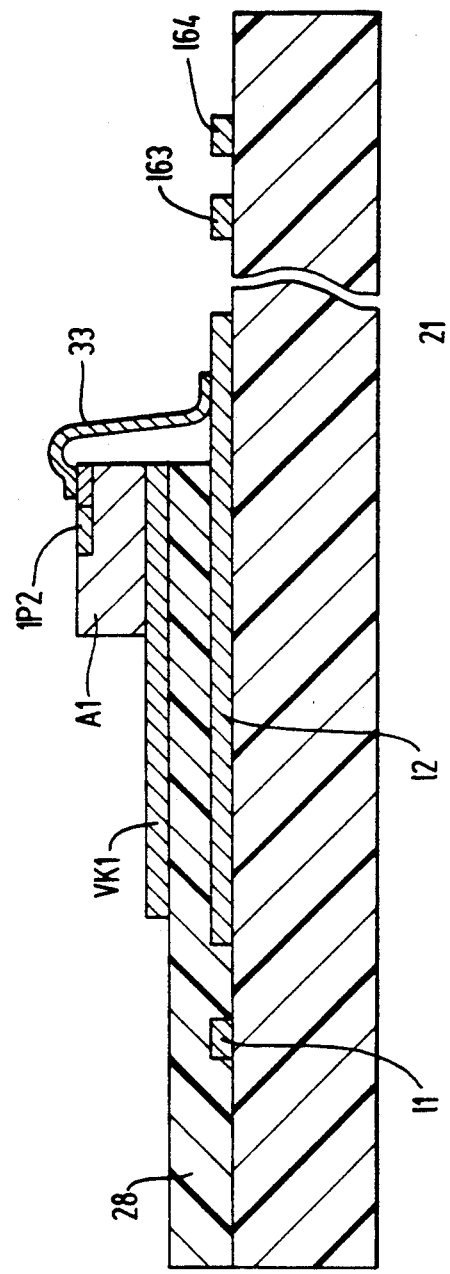

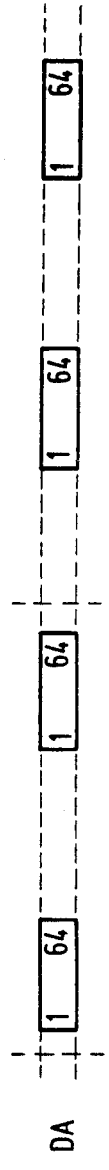
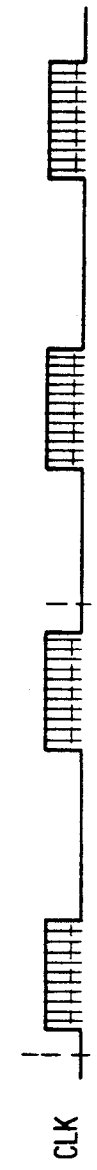
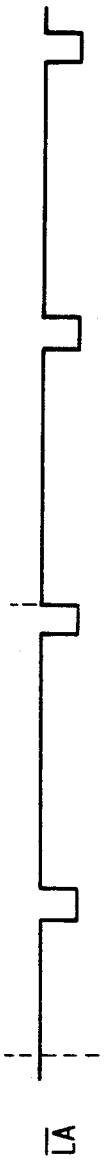
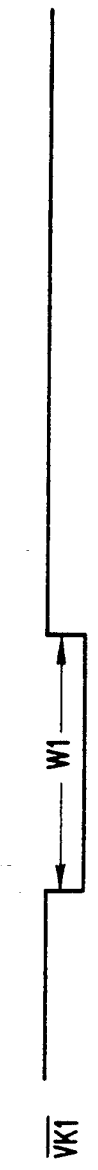
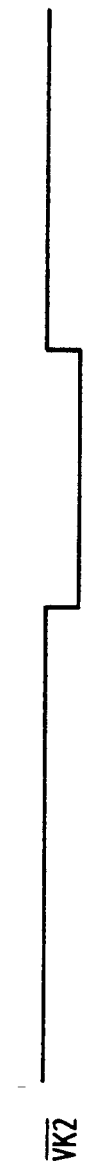
FIG. 18A ENB
FIG. 18B Q̄
FIG. 18C DA
FIG. 18D CLK
FIG. 18E L̄A
FIG. 18F V̄K1
FIG. 18G V̄K2
FIG. 18H V̄K40

IMAGE FORMING APPARATUS WITH DRIVING CIRCUIT ELEMENTS AT ENDS OF AN LED ARRAY SIMULTANEOUSLY TRANSMITTING SUPPLIED DATA IN OPPOSING DIRECTIONS AND SIMULTANEOUSLY DRIVING THE SAME BLOCK OF LEDS

BACKGROUND OF THE INVENTION

1. Field of the Invention

The present invention relates to an image forming apparatus that can be embodied in relation to, for example, a light emitting diode (abbreviated as LED) head and a thermal head or the like.

2. Description of the Prior Art

It is known in prior art to provide a light emitting diode head comprising a plurality of blocks each having a plurality of light emitting diodes arrayed in a row, one terminal of each of the printing elements disposed at symmetric positions on adjacent blocks being connected to an individual signal line in such a manner as to arrange the individual signal line in a zigzag form, the other terminal of each of the light emitting diodes being connected to a common signal line provided for each block, thus forming a so-called dynamic drive matrix wiring pattern. At one end of the array of the blocks is disposed a driving means which sequentially selects the common signal lines in the sequence of blocks and sequentially supplies power to the light emitting diodes contained in the selected block via the individual signal lines. The driving means drives the light emitting diodes selectively, with printing data to be recorded and individually corresponding to the light emitting diodes being given in the arrayed direction of the light emitting diodes from one end to the other end of the block.

According to the above prior art, only one driving means is provided and the construction is such that the driving means drives the light emitting diodes contained in the blocks by sequentially selecting the blocks. Therefore, as the number of blocks increases, it becomes more difficult to increase the printing speed. Suppose, for example, that it takes at least 34 $\mu$sec light emitting time for each energized light emitting diode to expose a photosensitized material. In this case, when a 300 dpi light emitting diode head for printing on a Japan Industrial Standard A4 paper is provided with a total of 40 blocks each having 64 light emitting diodes which are designed to be energized simultaneously, the time needed is 1.36 msec per line ($= 34$ $\mu$sec $\times 40$). It is therefore hoped to increase the printing speed.

SUMMARY OF THE INVENTION

An object of the invention is to provide an image forming apparatus capable of increasing the printing speed using printing elements such as light emitting diodes or the like.

The invention provides an image forming apparatus comprising:

printing means having an array of printing blocks each containing a plurality of printing elements arrayed in a row, one terminal of each of the printing elements disposed at symmetric positions on adjacent printing blocks being connected to an individual signal line, the other terminal thereof being connected to a common signal line provided for each block;

a data generating source for sequentially generating printing data for the printing elements of the printing means in the sequence in which the printing blocks are arrayed; and a plurality of driving means disposed at one end or at both ends of the array of the printing blocks for driving each block simultaneously, and matching the disposition of a plurality of block parts forming each block;

each driving means having output terminals respectively connected to the individual signal lines and further to the common signal lines via switching elements for selecting the blocks, and comprising means for selecting the common signal lines in the sequence of the printing blocks in response to the printing data from the data generating source and supplying power corresponding to the printing data to the respective printing elements in the selected printing block via the individual signal lines of the corresponding block parts.

In a preferred embodiment, the plurality of driving means of the image forming apparatus comprises a plurality of memorizing means connected each other which transmit sequentially printing data input, and which are connected each other by way of a changing means of transmitting direction which change alternately the transmitting direction of printing data to inverse direction corresponding with selecting signal.

In another preferred embodiment, the plurality of driving means at one end or at both end of the array of printing blocks of the image forming apparatus is characterized by a plurality of the changing means of transmitting direction connected each other, and by transmitting printing data in one direction or in other direction over a plurality of driving means.

In a still another preferred embodiment, the image forming apparatus comprises a plurality of driving means in one end of the array of printing blocks.

In a further preferred embodiment, the image forming apparatus comprises a plurality of driving means in both end of the array of printing blocks.

In a still further preferred embodiment, the image forming apparatus comprises a plurality of driving means including a power source which supplies the connected printing elements power corresponding with data signal.

Also, the present invention provides an image forming apparatus comprising:

printing means having an array of printing blocks each containing a plurality of printing elements arrayed in a row, one terminal of each of the printing elements disposed at symmetric positions on adjacent printing blocks being connected to an individual signal line, the other terminal thereof being connected to a common signal line provided for each block;

a data generating source for sequentially generating printing data for the printing elements of the printing means in the sequence in which the printing elements are arrayed; and a pair of first and second driving means respectively disposed at both ends of the array of the printing blocks for driving the printing blocks;

each driving means being connected to the individual signal lines and to the common signal lines via block selecting switching elements and being so constructed that the common signal lines are selected in the sequence of blocks in response to the printing data from the data generating source, supplying power corresponding to the printing data to the printing elements in the oppositely arrayed directions of the printing elements, and thus driving the printing elements contained in the selected block simultaneously by the first and second driving means.

Further, the present invention comprises a switching signal generating source for generating a switching signal for alternately changing the storing direction of printing data, from block to block, generated from the data generating source, wherein:

the first driving means disposed at one end of the array of the blocks operates in response to the switching signal from the switching signal generating source, inverts the switching signal, and delivers the inverted switching signal from an output terminal thereof; and the second driving means disposed at the other end of the array of the blocks has an input terminal for receiving the inverted switching signal from the output terminal and operates in response to the inverted switching signal applied through the input terminal.

In a yet further preferred embodiment, the image forming apparatus described above further comprises comprising a plurality of driving means provided with a plurality of memorizing means connected each other which transmit sequentially printing data input, and which are connected each other by way of a changing means of transmitting direction which change alternately the transmitting direction of printing data to inverse direction corresponding with selecting signal.

Preferably the image forming apparatus comprises a plurality of driving means including a power source which supplies the connected printing elements power corresponding with data signal.

According to the invention, the individual signal lines each connected to one terminal of each of the printing elements. such as light emitting diodes or heating resistors of a thermal head. disposed at symmetric positions on adjacent printing blocks is arranged in a zigzag form, and printing data to be supplied to the respective printing elements are sequentially output from the data generating source, the printing data being fed to the driving means disposed at each end of the array of the printing blocks and connected to the individual signal lines corresponding to the respective printing block parts, these plurality driving means supplying power corresponding to the printing data to the printing elements contained in the selected printing block via the individual signal lines of the corresponding block parts. Since the numerous printing elements contained in the block parts corresponding to the driving means are driven all at a time by these driving means, the number of printing elements contained in each printing block can be increased, consequently decreasing the number of printing blocks and thereby increasing the printing speed. Suppose, for example, in an image forming apparatus comprising a total of 20 printing blocks, each printing block is composed of two block parts each having 64 light emitting diodes and that the light emitting diodes in one printing block are energized all at a time for 34 $\mu$sec for exposing a photosensitized material. In this case, a printing speed of 0.68 msec per line ($=34$ $\mu$sec$\times 20$) can be achieved. On the other hand, in the case of the driving means which is so constructed as to sequentially drive the blocks one at a time, each block having 64 light emitting diodes, as in the case of the foregoing description of the prior art, a total of 40 blocks are needed, resulting in a slow printing speed of 1.36 msec per line ($=34$ $\mu$sec$\times 40$). Furthermore, when transferring printing data. for example, for a total of 128 light emitting diodes to the driving means in accordance with the invention, the printing data can be transferred, for example, at 10 MHz, which means the time required for the transfer of data is 12.8 $\mu$sec ($=128$ dots/10 MHz), thus enabling printing data for the next block to be transferred during the driving of light emitting diodes of one block.

As described above, according to the invention, a plurality of driving means are provided at one end or at both ends of the array of the blocks, each driving means driving the printing elements contained in the selected block by supplying power corresponding to the printing data via the individual signal lines corresponding to the plurality of block parts contained in the block, therefore, the number of printing elements simultaneously energized in each block can be increased, which makes it possible to increase the printing speed. Also, by providing the driving means at both ends of the array of the blocks and applying power to the printing elements simultaneously by the driving means provided at both ends, the current value to be applied to each printing element can be increased, which also serves to increase the printing speed.

Also, according to the invention, the individual signal lines connected to one terminal of each of the printing elements, such as light emitting diodes or heating resistors of the thermal head, disposed at symmetric positions on adjacent blocks is arranged in a zigzag form, printing data to be supplied to the respective printing elements are sequentially output from the data generating source, the driving means that respond to the printing data from the data generating source are respectively provided at both ends of the array of the blocks, at least a pair of such driving means being provided and the common lines being selected in the sequence of blocks, and the driving means respectively provided at both ends of the array of the blocks simultaneously drive the printing elements contained in the selected block by supplying power corresponding to the printing data in the oppositely arrayed directions of the printing elements via the individual signal lines. Therefore, one printing element is driven simultaneously by the driving means respectively provided at both ends of the array of the blocks, which makes it possible to increase the current to be applied to the printing element. This therefore serves to increase the light output in the case of the printing elements consisting of light emitting diodes and the heat output in the case of the printing element consisting of heating resistors, making it possible to reduce the energizing time and thus increase the printing speed. Compared with the previously described prior art, according to the invention, the required light emitting time of the light emitting diode as a printing element, for example, becomes shorter than the 34 $\mu$sec required in the prior art and can be reduced, for example, to 22 $\mu$sec, thus achieving an increased printing speed which, in the case of an image forming apparatus having a total of 40 blocks, is 0.88 msec per line ($=22$ $\mu$sec$\times 40$).

Furthermore, according to the invention, the switching signal generating source generates a switching signal for alternately changing the storing direction of printing data, from block to block, generated from the data generating source, the switching signal is supplied to one driving means having an output terminal from which an inverted switching signal created by inverting the switching signal is delivered, and the other driving means has an input terminal for receiving the inverted switching signal from the output terminal and operates in response to the inverted switching signal supplied through the input terminal. Therefore, the one driving means and the other driving means have fundamentally the same construction, the one driving means operating in response to the switching signal supplied from the switching signal generating means, the other driving means operating by receiving through its input terminal the inverted selecting signal delivered from the output terminal of the one driving means, thus enabling the present invention to be embodied in a simple construction.

As described above, according to the invention, a pair of driving means are provided, one at one end and the other at the other end of the array of the blocks of printing elements so that the printing elements contained in the selected block are driven simultaneously by the pair of driving means, which makes it possible to increase the current to be applied to the printing elements and thus increase the light output in the case of the printing elements consisting of light emitting diodes and the heat output in the case of the printing elements consisting of heating resistors. This serves to reduce the required time for energization, making it possible to increase the printing speed.

Furthermore, according to the present invention, the switching signal from the switching signal generating source is applied to the one driving means to alternately change the storing direction of the printing data, and the one driving means inverts the switching signal, the inverted signal being delivered from its output terminal and applied to the input terminal of the other driving means which is adapted to operate in response to the inverted switching signal received through its input terminal. Therefore, the one and the other driving means both have the same configuration and can be operated with the respective data storing directions and thus the printing data transfer directions reversed from each other, thus achieving the simplification of the construction.

BRIEF DESCRIPTION OF THE DRAWINGS

Other and further objects, features, and advantages of the invention will be more explicit from the following detailed description taken with reference to the drawings wherein:

FIG. 7($a$) shows waveform of signal $\overline{ENB}$.

FIG. 7($b$) shows waveform of signal $\overline{Q}$,

FIG. 7($c$) shows waveform of printing data DA,

FIG. 7($d$) shows waveform of clock signal CLK,

FIG. 7($e$) shows waveform of latch signal $\overline{LA}$,

FIG. 7($f$) shows state of block switching signal $\overline{VK1}$.

FIG. 7($g$) shows state of block switching signal $\overline{VK2}$,

FIG. 7($h$) shows state of block switching signal $\overline{VK3}$,

FIG. 11($a$) shows waveform of signal $\overline{ENB}$.

FIG. 11($b$) shows waveform of signal $\overline{Q}$,

FIG. 11($c$) shows waveform of printing data DA,

FIG. 11($d$) shows waveform of clock signal CLK,

FIG. 11($e$) shows waveform of latch signal $\overline{LA}$,

FIG. 11($f$) shows state of block switching signal $\overline{VK1}$,

FIG. 11($g$) shows state of block switching signal $\overline{VK2}$,

FIG. 11($h$) shows state of block switching signal $\overline{VK3}$,

FIG. 17 is a cross sectional view taken along line XV—XV in FIG. 15;

FIG. 18($a$) shows waveform of signal $\overline{ENB}$.

FIG. 18($b$) shows waveform of signal $\overline{Q}$,

FIG. 18($c$) shows waveform of printing data DA,

FIG. 18($d$) shows waveform of clock signal CLK,

FIG. 18($e$) shows waveform of latch signal $\overline{LA}$,

FIG. 18($f$) shows state of block switching signal $\overline{VK1}$,

FIG. 18($g$) shows state of block switching signal $\overline{VK2}$, and

FIG. 18($h$) shows state of block switching signal $\overline{VK40}$.

DETAILED DESCRIPTION OF THE PREFERRED EMBODIMENTS

Figure 1:
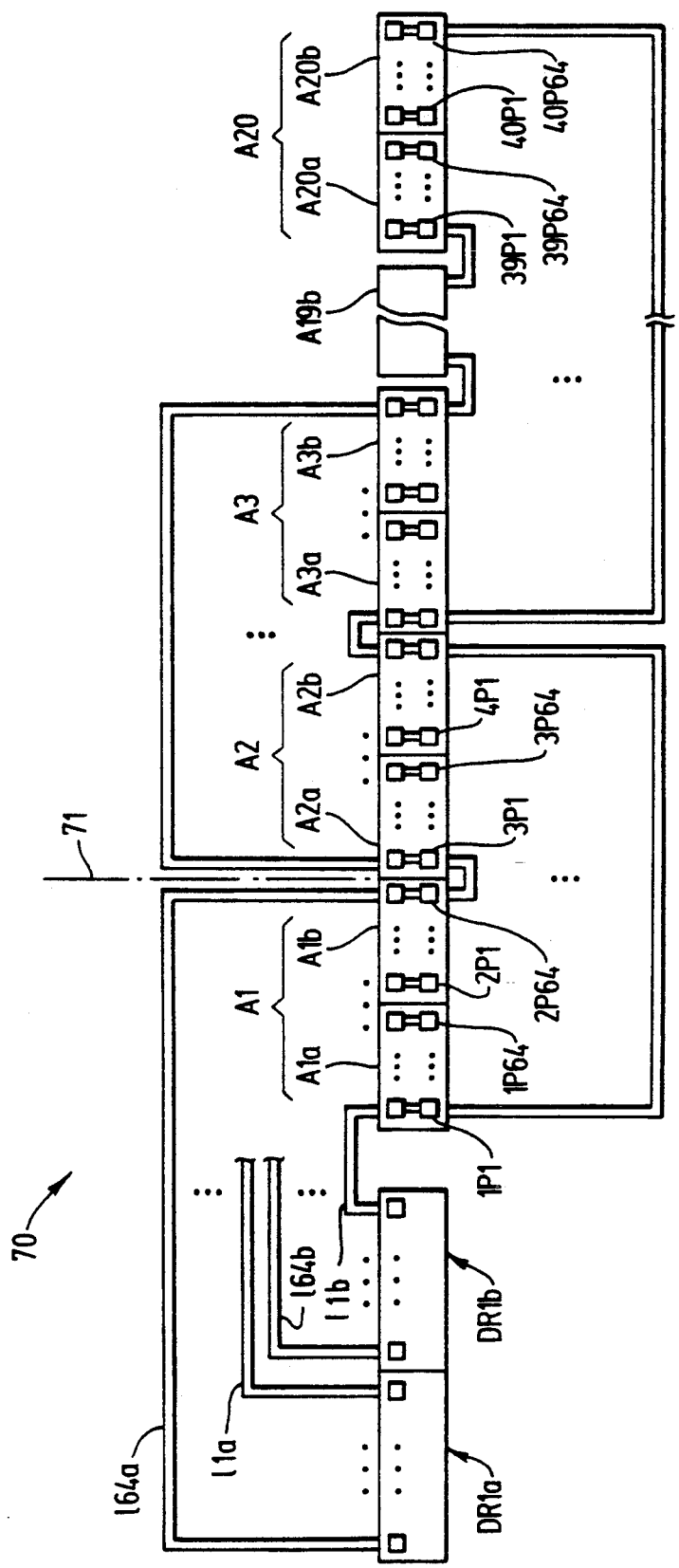
FIG. 1 is a simplified block diagram of one embodiment of the invention.

Now referring to the drawing, preferred embodiments of the invention is described below.

FIG. 1 is a simplified general block diagram of one embodiment of the invention. The image forming apparatus of this embodiment is provided with a light emitting diode head or printing means 70 which has a plurality (20 in this embodiment) of printing blocks A1–A20 arrayed in a row in the horizontal direction in FIG. 1 and exposes a photosensitized material being transported in the direction orthogonal to the arrayed direction of the printing blocks (in the vertical direction in FIG. 1) to form an image on the photosensitized material. A pair of driving means DR1a and DR1b are disposed at one end of the array of the printing blocks A1-A20, and energize and drive the light emitting diodes contained in the blocks in the sequence in which the blocks are arrayed. The printing block A1 comprises a plurality (2 in this embodiment) of blocks parts A1a and A1b. The other printing blocks A2-A20 also have the same configuration.

Figure 2:
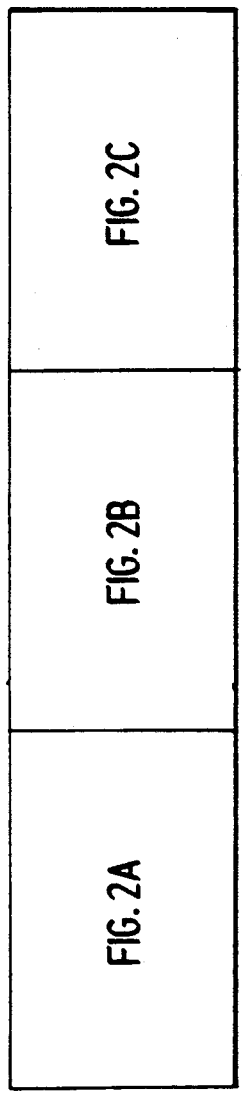
FIG. 2 is a diagram showing the configuration of the embodiment.

FIG. 2 is a block diagram showing the detailed configuration of each of the driving means DR1a and DR1b. The printing blocks A1-A20 contain light emitting diodes 1P1-1P64; . . . ; 40P1-40P64, each block having a total of 128 light emitting diodes. The block part A1a has a total of 64 light emitting diodes 1P1-1P64, and the block part A1b has a total of 64 light emitting diodes 2P1-2P64. The remaining block parts are the same in configuration.

An output from a flip-flop F1a in the driving means DR1a passes through a first switching element 183a and a line 111 and is fed from an output terminal 131 to input to an input terminal 132 of the other driving means DR1b, thus coupling together the driving means DR1a and DR1b so that data is continuously transferred from the driving means DR1a to DR1b.

A switching signal from a line 104a in the driving means DR1a is transferred via a line 104c to an output terminal 133 from which the signal is fed to a line 104b through an input 134 terminal of the other driving means DR1b.

Figure 2A:
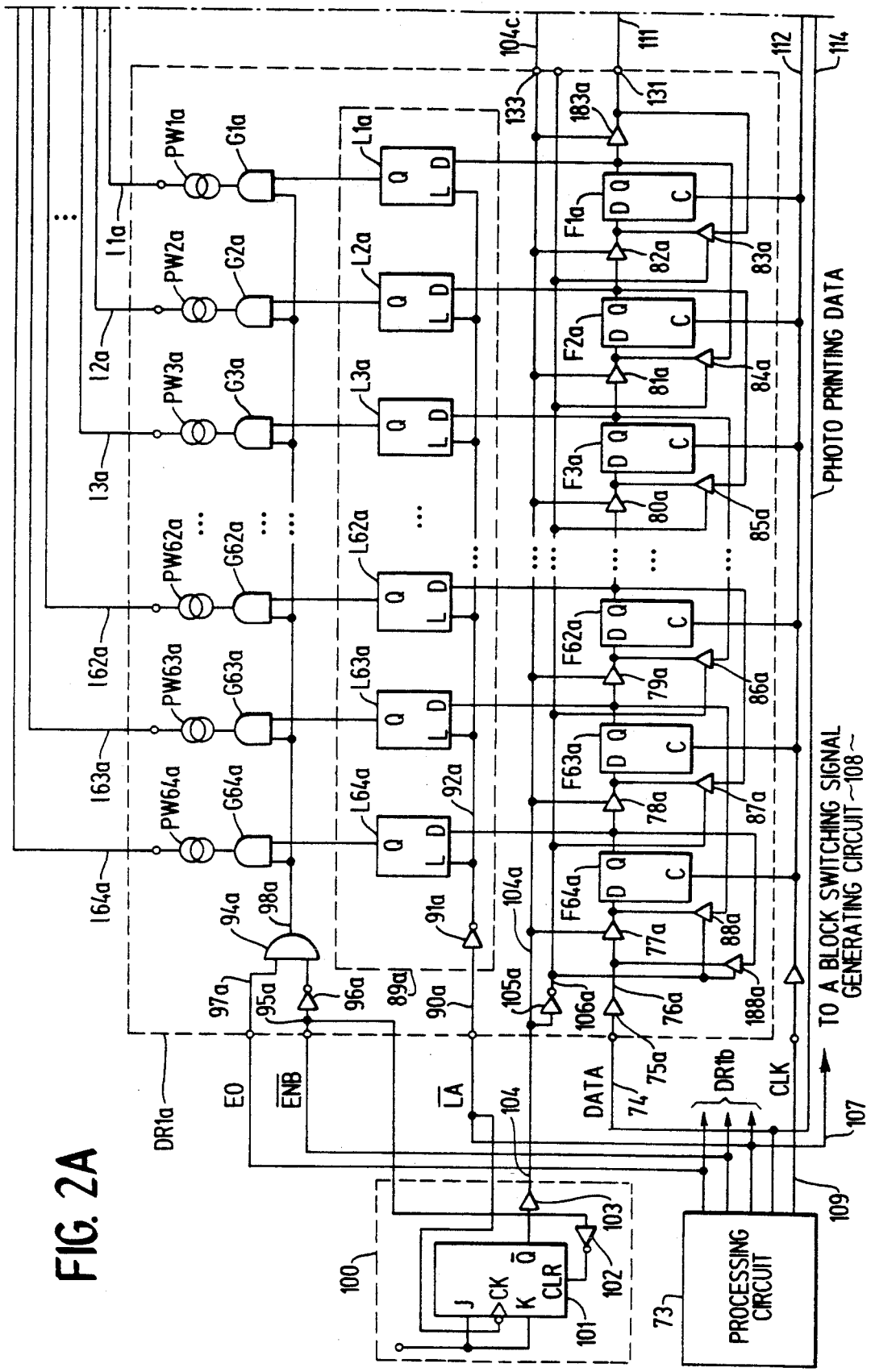
FIG. 2A is a block diagram showing the configuration of driving means DR1$a$.
Figure 2B:
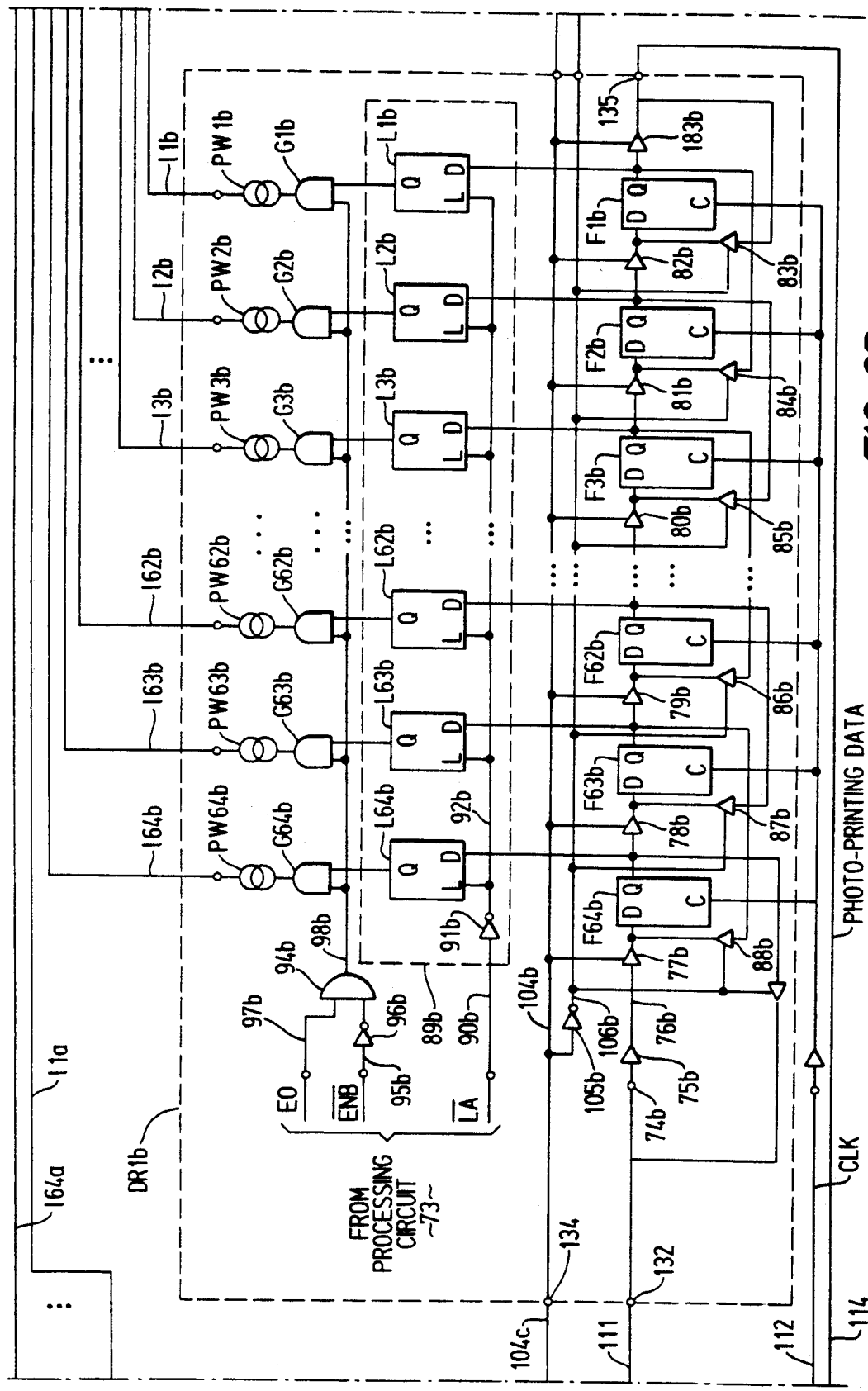
FIG. 2B a block diagram of driving means DR1$b$.
Figure 2C:
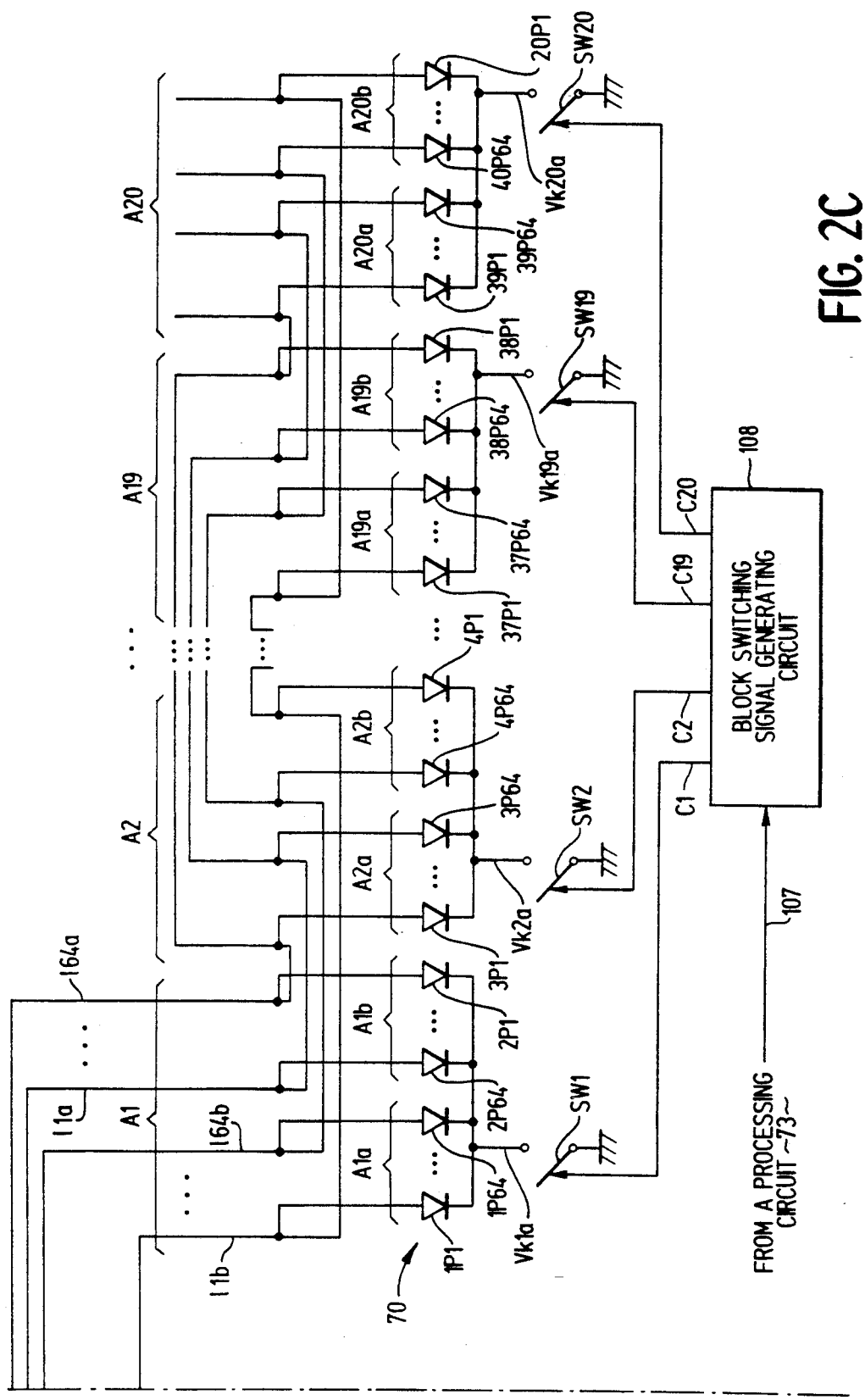
FIG. 2C a block diagram of printing means 70$a$.

In storing and transferring printing data from a processing circuit 73 in the reverse direction (from right to left in FIGS. 2A and 2B), the printing data is fed via a line 114 to an output terminal 135 which also serves as an input terminal of the driving means DR1b and from which the data is given to a switching element 83b and input to a flip-flop F1b. An output of the flip-flop F1b is given to a switching element 84b and then to switching elements 85b-88b in this sequence, thus inputting up to F64b. An output of the first stage flip-flop F64b of the driving means DR1b is given to a line 74b via a switching element 188b to which an inverted switching signal is given from a line 106b. The other driving means DR1a also has the same configuration and a character "a" is suffixed to the same numbers to designate the corresponding parts.

Figure 4:
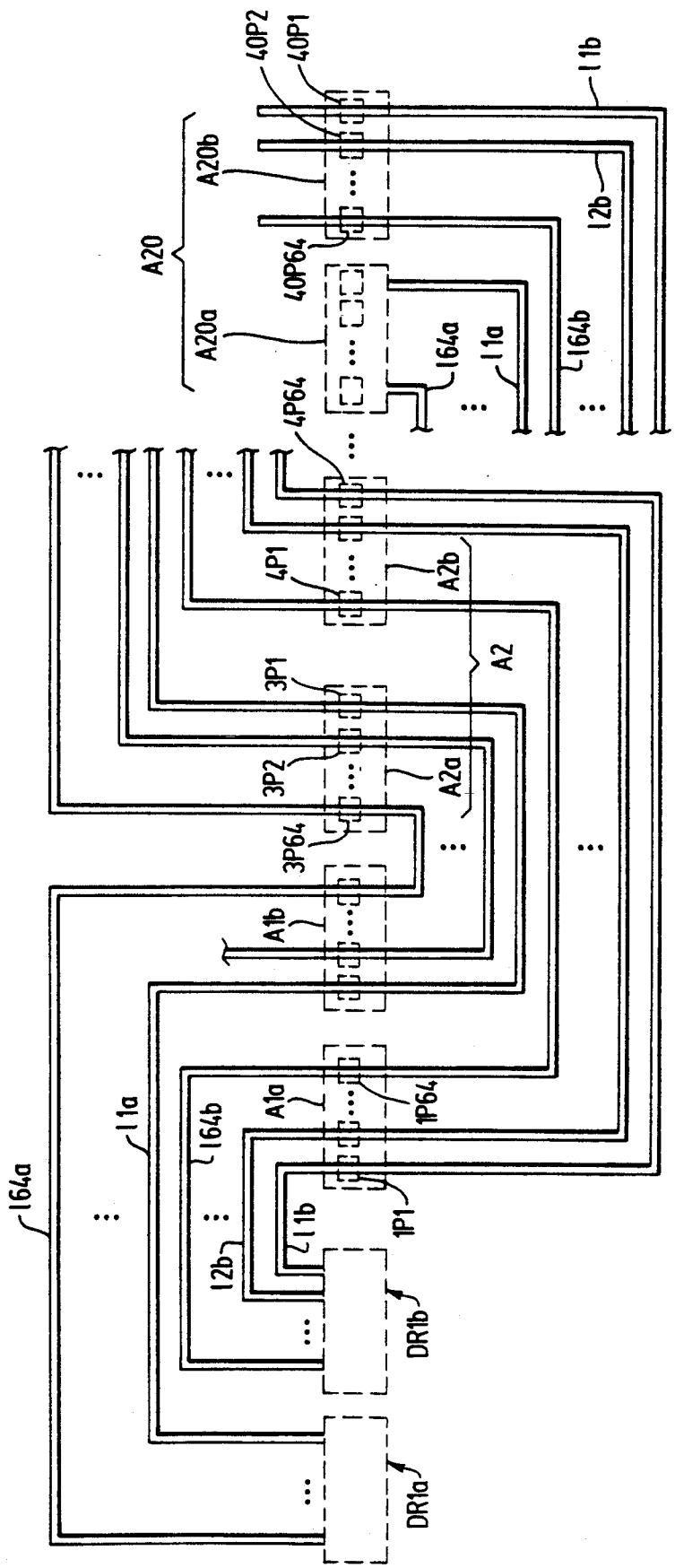
FIG. 4 is another simplified plan view of the printing means 70.

FIG. 4 is a simplified plan view of the printing means 70. One terminal of each of the light emitting diodes contained in the printing blocks A1-A20 is connected to one of individual signal lines 11a-164a, 11b-164b.

Figure 3:
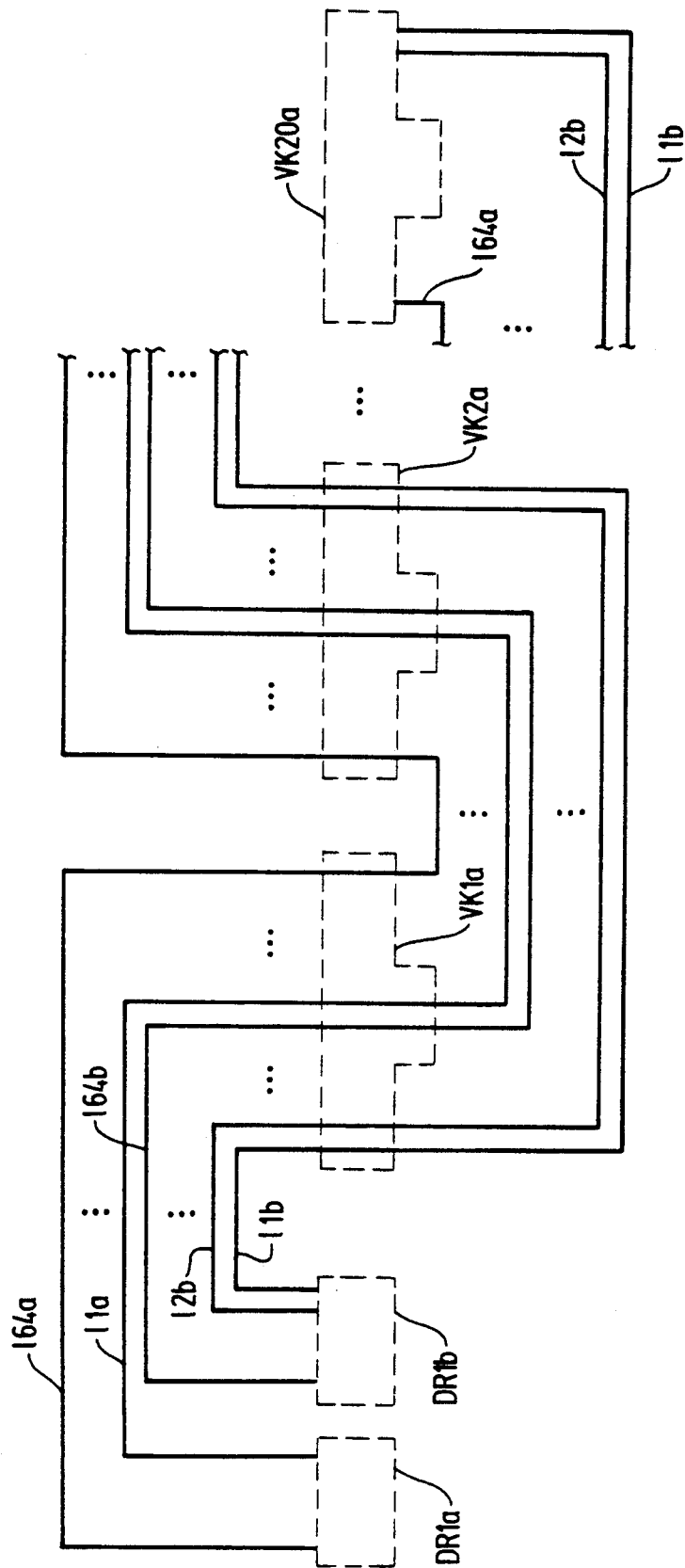
FIG. 3 is a simplified plan view of printing means 70.

FIG. 3 is another simplified plan view of the printing means 70. The other terminal of each of the light emitting diodes contained in the printing blocks A1-A20 is connected to one of common signal lines VK1a-VK20a respectively provided for the printing blocks A1-A20.

Figure 5:
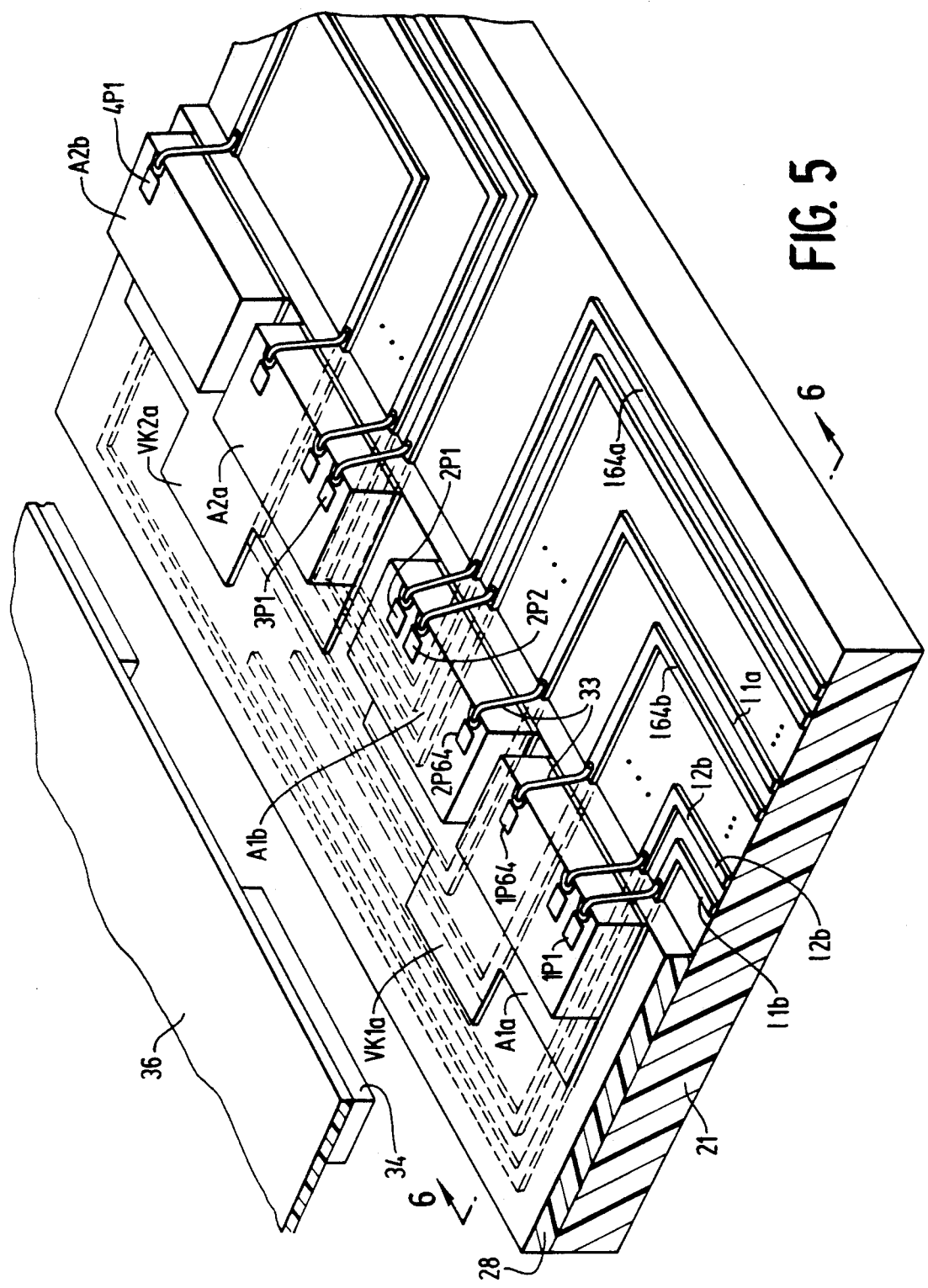
FIG. 5 is perspective view showing a portion of the printing means 70.
Figure 6:
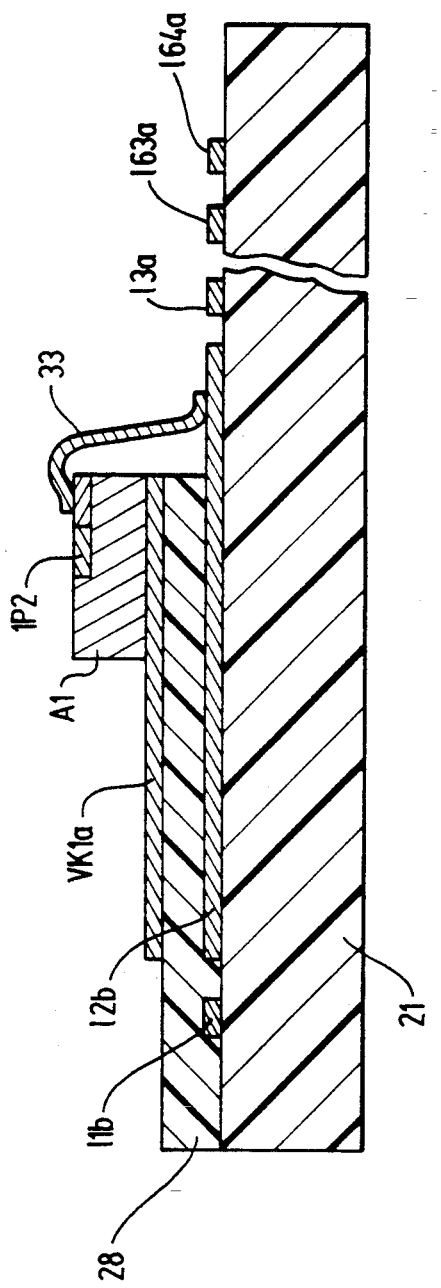
FIG. 6 is a cross sectional view taken along line V—V in FIG. 3.

FIG. 5 is a perspective view of a portion of the printing means 70, and FIG. 6 shows a cross section taken along line 6—6 in FIG. 5. A substrate 21 is formed from an electrical insulating material such as ceramic or glass, on the surface of which the individual signal lines 11a-164a, 11b-164b are formed in a zigzag or cranked arrangement. The individual signal lines 11a-164a, 11b-64b are respectively connected to one terminal of each of the light emitting diodes disposed at symmetric positions on adjacent blocks, such pairs of light emitting diodes including, for example, 1p1/4p64 and 1p2/4p63 disposed at symmetric positions on A1 and A2 with respect to the plane of symmetry 71 (see FIGS. 1 and 3).

The wiring board 21 has an electrical insulating layer 28 formed thereon partially covering the individual signal lines 11a-164a, 11b-164b, and the common signal lines VK1a-VK20a are formed on the electrical insulating layer 28. The other terminals of the light emitting diodes 1P1-1P64; . . . ; 40P1-40P64 in the blocks A1-A20 are connected in common on a block-by-block basis to the respective common signal lines VK1a-VK-20a. That is, the light emitting diodes 1P1-1P64, 2P1-2P64 contained in the block parts A1a, A1b of the block A1 are connected to the common signal line VK1a corresponding to the block A1. The same goes with the remaining blocks A2-A20.

As is apparent from FIG. 6, the light emitting diode 1P2 and the individual signal line 12a are interconnected by a bonding wire 33. The other light emitting diodes are also configured in the same manner.

Each of the common signal lines VK1a-VK20a is electrically connected to a conductor 34 formed on one surface of a flexible film 36 (FIG. 5).

Referring back to FIG. 2, the driving means DR1a and DR1b for driving the printing means 70 are disposed on the substrate 21 and, based on sequential printing data supplied from the processing circuit 73, the driving means DR1a and DR1b drive the light emitting diodes 1P1-1P64; . . . ; 40P1-40P64 of the printing means 70 block by block in the sequence in which the blocks are arrayed, that is, from right to left in FIGS. 1 and 2.

The driving means DR1a and DR1b include D-type flip-flops F1a-F64a and F1b-F64b which are storage elements individually corresponding to the light emitting diodes in each block A1-A20. Printing data DA supplied from the processing circuit 73 via a line 74 is passed through a buffer 75a and a line 76a and is given to an input terminal of the first stage flip-flop F64a via a first switching element 77a. An output Q of the flip-flop F64a is supplied to a first switching element 78a through which it is given to the flip-flop F63a at the next stage. The same goes with the other first switching elements 79a-82a and 183a.

The first switching elements 77a-82a and 183a are thus made to conduct, allowing the printing data to be transferred in the forward direction from left to right in FIG. 2. The printing data from the first switching device 183a is given in the forward direction to the other driving means DR1b for storing.

To transfer printing data in the reverse direction from right to left in FIG. 2, the printing data supplied from the first-stage flip-flop F64b of the driving means DR1b is transferred in the reverse direction from the line 111 and the input/output terminal 132 to the input terminal 131 of the driving means DR1a through the line 111 thereof and is given to the input terminal of the last-stage flip-flop F1a through a second switching element 83a, the output Q of the last-stage flip-flop F1a then being given to an input of the storage element F2a at the preceding stage through a second switching element 84a. The same goes with the other second switching elements 85a-88a and 188a.

The outputs of the flip-flops F1a-F64a are respectively supplied to the inputs of D-type flip-flops L1a-L64a included in a latch circuit 89a. The flip-flops L1a-L64a perform latching when a latch signal $\overline{LA}$ given from the processing circuit 73 to a line 90a is supplied via an inverting circuit 91a and a line 92a. The output of each flip-flop L1a-L64a in the latch circuit 89a is supplied to one input of its corresponding AND gate G1a-G64a, and the outputs of the AND gates G1a-G64a are respectively supplied to current sources PW1a-PW64a. The current sources PW1a-PW164a supply current using the individual signal lines 11a-11-64a as the other potential, thus supplying power to drive the light emitting diodes.

An enabling signal $\overline{ENB}$ is supplied from the processing circuit 73 to an AND gate 94a via a line 95a and an inverting circuit 96a. A signal EO which goes high at power on is also supplied from the processing circuit to the AND gate 94a via a line 97a. The output of the AND gate 94a is supplied via a line 98a to the other input of each AND gate G1a-G64a.

A switching signal generating source 100 includes a J-K flip-flop 101 the truth table for which is shown in Table 1.

TABLE 1

| CLR | CK | J | K | Q |
|-----|-----|---|---|---|
| L | x | x | x | H |
| H | | H | H | Toggle |

The input terminals J and K of the flip-flop 101a are connected to the power source and are normally at a high level. The enabling signal $\overline{ENB}$ is given to the clear input terminal CLK via an inverting circuit 102 through a line 95, while the latch signal $\overline{LA}$ is input to the clock input terminal CK. The output from the output terminal $\overline{Q}$ is supplied as a switching signal from a buffer 103 to the first switching elements 77a-82a via the line 104a, the switching elements 77a-82a being made to conduct by a high level signal from the line 104a and to shut off by a low level signal therefrom. The switching signal from the buffer 103 is inverted by an inverting circuit 105a, and the thus inverted signal is given as the other switching signal to the second switching elements 83a-88a via the line 106a. The second switching elements 83a-88a are made to conduct when the inverted switching signal from the line 106a is high, and shut off when it is low. The other driving means DR1b is configured likewise, wherein the corresponding parts are indicated by like numerals with a character "b" suffixed instead of "a".

The lines 104a and 104b are interconnected by the line 104c, thus supplying the output of the flip-flop F1a in the driving means DR1a to the input of the flip-flop F64b in the driving means DR1b via the lines 111 and 74b, the terminals 131 and 132, the buffer 75b, and the first switching element 77b. Further, the printing data from the processing circuit 73 is transferred via the line 114, input at the terminal 135 of the driving means DR1b, and given to the flip-flop F1b via the second switching element 83b. The output of the flip-flop F64b in the driving means DR1b is given through the switching element 88b and the line 111 and further through the terminals 132 and 131 to the flip-flop F1a in the driving means DR1a via the second switching element 83a.

The light emitting diodes in the blocks A1-A20 are connected block by block to corresponding switches SW1a-SW20a via the respective common signal lines VK1a-VK20a, and each switch SW1a-SW20a is connected to the ground potential. The latch signal $\overline{LA}$ is given to a block switching circuit 108 via a line 107. In response to the latch signal $\overline{LA}$, the block switching circuit 108 supplies a block switching signal to the switches SW1-SW20 via lines C1-C20, thereby sequentially activating the switches SW1-SW20 for the blocks A1-A20 one at a time.

The operations of the printing means 70 and the driving means DR1a and DR1b are now described with reference to FIG. 7. To initiate an image forming operation, the processing circuit 73 applies a high level signal to the line 97a, while the enabling signal $\overline{ENB}$ is caused to turn from high to low, as shown in FIG. 7(a), which in turn causes the signal derived from the AND gate 94a to the line 98a of the driving means DR1a to go high. Also, when the enabling signal $\overline{ENB}$ is at a high level, the signal is inverted to a low level by the inverting circuit 102 to clear the flip-flop 101 in the switching signal generating source 100, causing the output $\overline{Q}$ thereof to go high. In these circumstances, the flip-flop 101 is enabled to receive the latch signal $\overline{LA}$ at the clock input terminal CK. The waveform of the output $\overline{Q}$ of the flip-flop 101, and thus the waveform of the line 104, is shown in FIG. 7(b). With the output $\overline{Q}$ at a high level, the first switching elements 77a-82a stay in a conducting state. This is also true of the other driving means DR1b. Thus, when 128 items of printing data DA are sequentially derived from the processing circuit 73 to the line 74 in serial bits as shown in FIG. 7(c), the flip-flops F1a-F64a and F1b-F64b operating in synchronism with the clock signal CLK shown in FIG. 7(d) derived from the processing circuit 73 via the line 109 store the data for the light emitting diodes for one block, i.e. for a total of 128 bits, in the sequence from the flip-flop F64a to the flip-flop F1a and from F64b to F1b, the data being transferred from left to right in FIG. 2. After the data for one block have thus been transferred, the latch signal $\overline{LA}$ shown in FIG. 7(e) is given from the processing circuit 73, causing the printing data stored in the flip-flops F1a-F64a and f1b-F64b to be transferred in parallel to the flip-flops L1a-L64a and L1b-L64b in the latch circuits 89a and 89b for latching therein.

The latch signal $\overline{LA}$ is given to the clock input terminal CK of the flip-flop 101 in the switching signal generating source 100, and the output $\overline{Q}$ changes from a high to a low level at the falling edge of the latch signal $\overline{LA}$. This causes the first switching elements 77a-82a and 77b-82b to shut off and the second switching elements 83b-88b and 83a-88a to conduct, changing the flip-flops F1b-F64b and F1a-F64a to a state enabled for inputs in the sequence from right to left in FIG. 2. Responding to the latch signal $\overline{LA}$, the block switching circuit 108 supplies the block switching signal of FIG. 7(f) to the switch SW1a via the line C1, thereby causing the switch SW1a to stay in a conducting state during the low period W1 of the line C1. Thus, the light emitting diodes 1P1-1P64 and 2P1-2P64 contained in the block parts A1a and A1b of the first block A1 are energized by the current from the current sources PW1a-PW64a and PW1b-PW64b, and illuminate to perform printing. During the period W1 in which the switch SW1a is in a conducting state, the printing data DA for the second block A2 is supplied from the processing circuit 73 to the line 74 and is stored in the flip-flops F1b-F64b and F1a-F64a in this order, via the second switching elements 83b-88b and 83a-88a. The printing data for the light emitting diode 3P1 in the second block A2 is stored in the flip-flop F64a, while the printing data for the light emitting diode 3P64 is stored in the flip-flop F1b. Thus, during the period in which the light emitting diodes 1P1-1P64 and 2P1-2P64 in the first block A1 are energized, the printing data for the light emitting diodes 3P1-3P64 and 4P1-4P64 in the second block A2 are stored in the flip-flops F1a-F64a and F1b-F64b. Then, when the latch signal $\overline{LA}$ is issued, the block switching signal generating circuit 108 supplied a low level signal shown in FIG. 7(g), causing the switch SW2a to conduct and thus energizing the light emitting diodes 3P1-3P64 and 4P1-4P64 in the second block A2 in accordance with the outputs from the latch circuits 89a and 89b. The above operation is repeated to sequentially drive the light emitting diodes in all blocks A1-A20. FIG. 7(h) shows a signal derived from the line C3 for the block A3.

Figure 8:
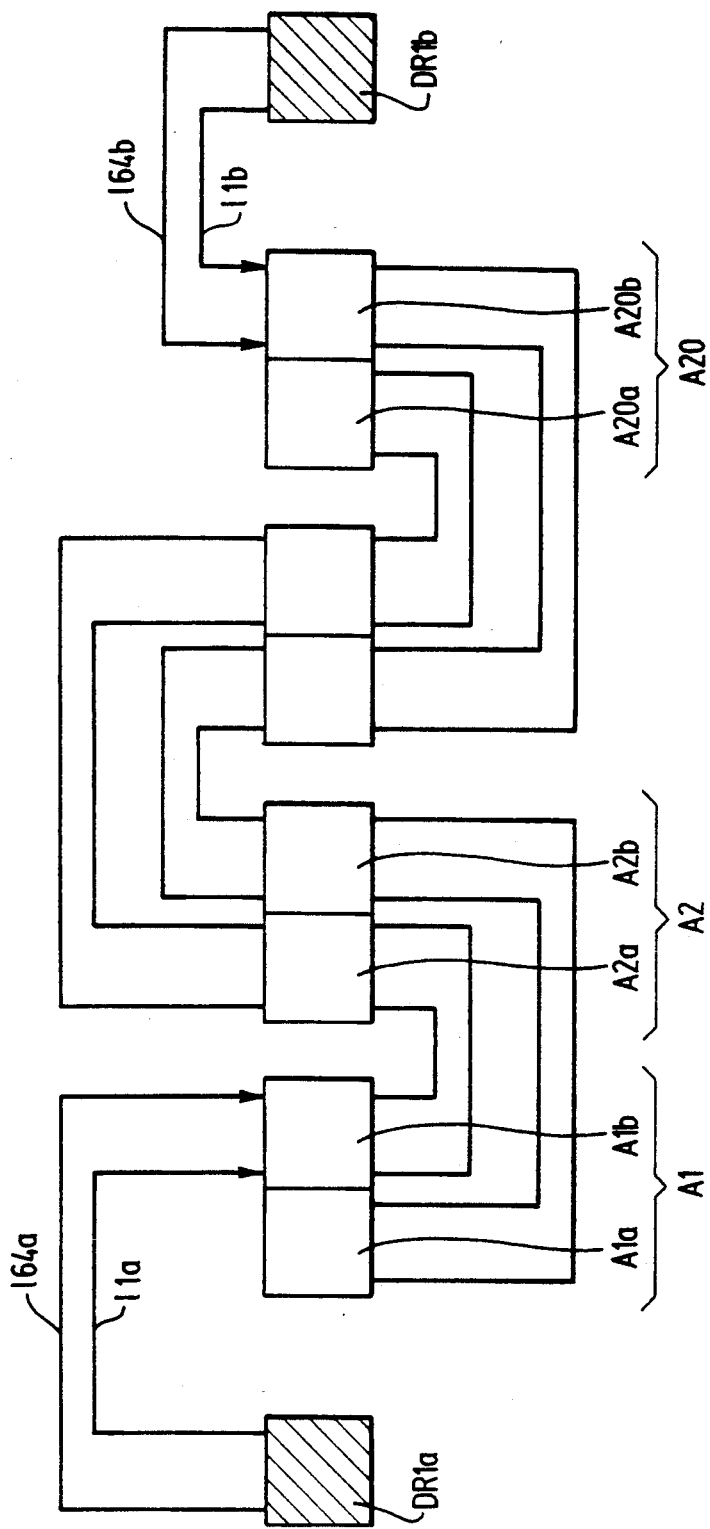
FIG. 8 is a simplified block diagram of another embodiment of the invention.

FIG. 8 is a simplified block diagram of another embodiment of the invention. In this embodiment, the driving means DR1a and DR1b are respectively disposed at both ends of the array of the blocks A1-A20 in the arrayed direction thereof (in the lateral direction in FIG. 8), the driving means DR1a being connected to the individual signal lines 11a-164a and the driving means DR1b connected to the lines 11b-164b, and the light emitting diodes contained in the blocks A1-A20 are energized simultaneously block by block in sequence. Such embodiment is also included in the spirit of the invention.

Figure 9:
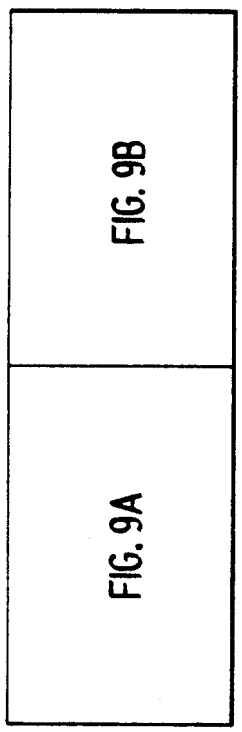
FIG. 9 is a diagram showing the configuration of still another embodiment of the invention.
Figure 9A:
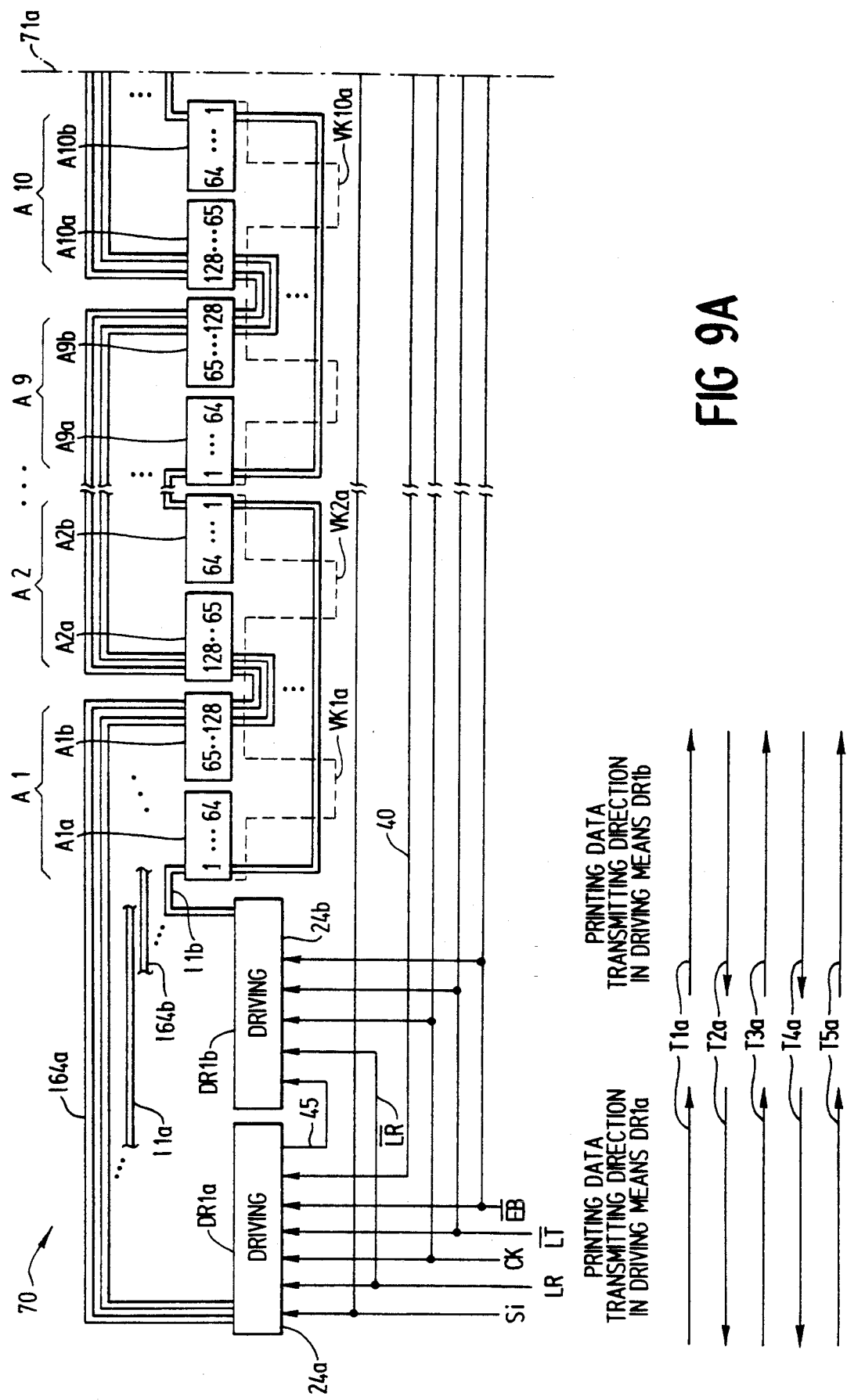
FIG. 9A is a plan view showing the configuration of a portion of the embodiment, and FIG. 9B a plan view showing the configuration of the remaining portion thereof.
Figure 9B:
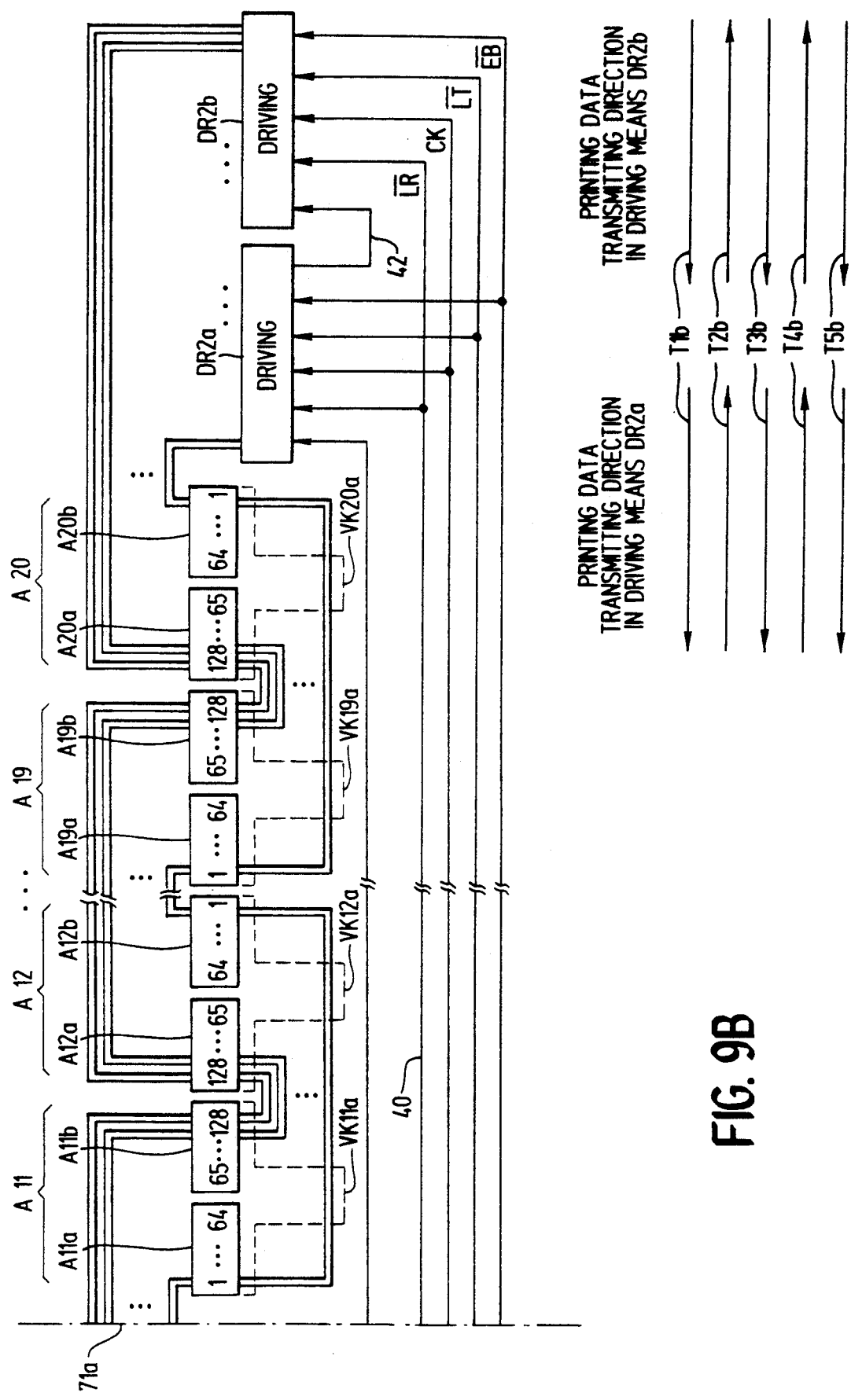

FIG. 9 is a simplified general block diagram of still another embodiment of the invention. This embodiment is similar to the foregoing embodiment, and like numerals are used to designate corresponding parts. It should be noted, in this embodiment, that driving means 70a is provided with a total of 20 printing blocks A1-A20 each having a plurality (2 in this embodiment) of block parts A1a, A1b; ...; A20a-A20b. The block part A1a contains a total of 64 light emitting diodes, and the block part A1b also contains a total of 64 light emitting diodes. The other block parts are also configured in the same manner. A plurality (2 in this embodiment) of driving means are provided at each end of the array of the printing blocks A1-A20 in the arrayed direction thereof (in the lateral direction in FIG. 9), the driving means DR1a. DR1b at one end and DR2a, DR2b at the other end.

Figure 10:
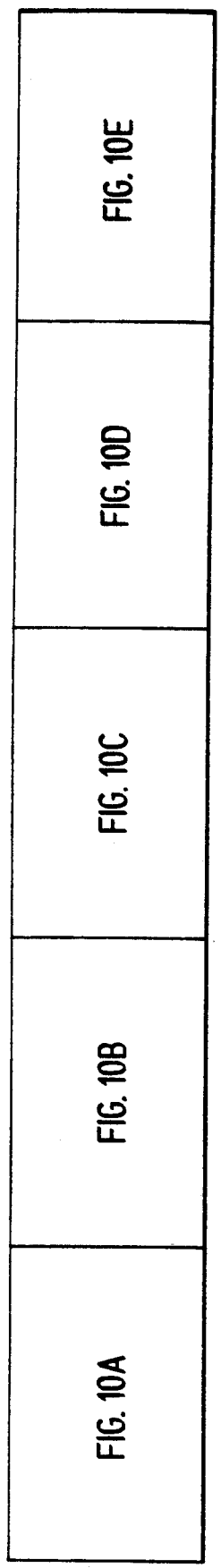
FIG. 10 is a diagram showing the configuration of the embodiment.
Figure 10B:
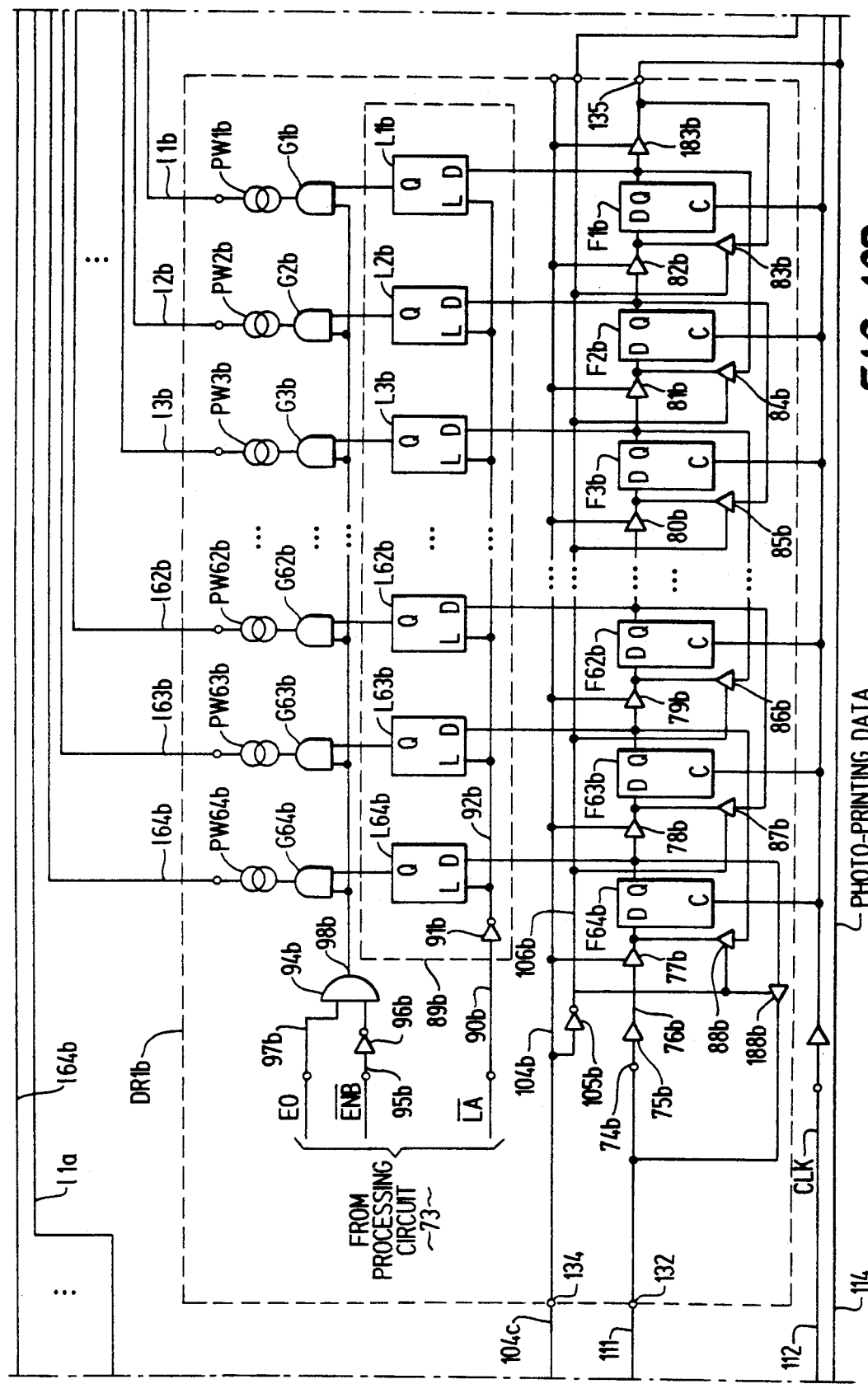
FIG. 10A is a block diagram showing an example of the configuration of driving means DR1$a$, FIG. 10B a block diagram showing an example of the configuration of driving means DR1$b$.
FIG. 10C a block diagram showing an example of the configuration of printing means 70$a$, FIG. 10D a block diagram showing an example of the configuration of driving means DR2$a$, and FIG. 10E a block diagram showing an example of the configuration of driving means DR2$b$.
Figure 10C:
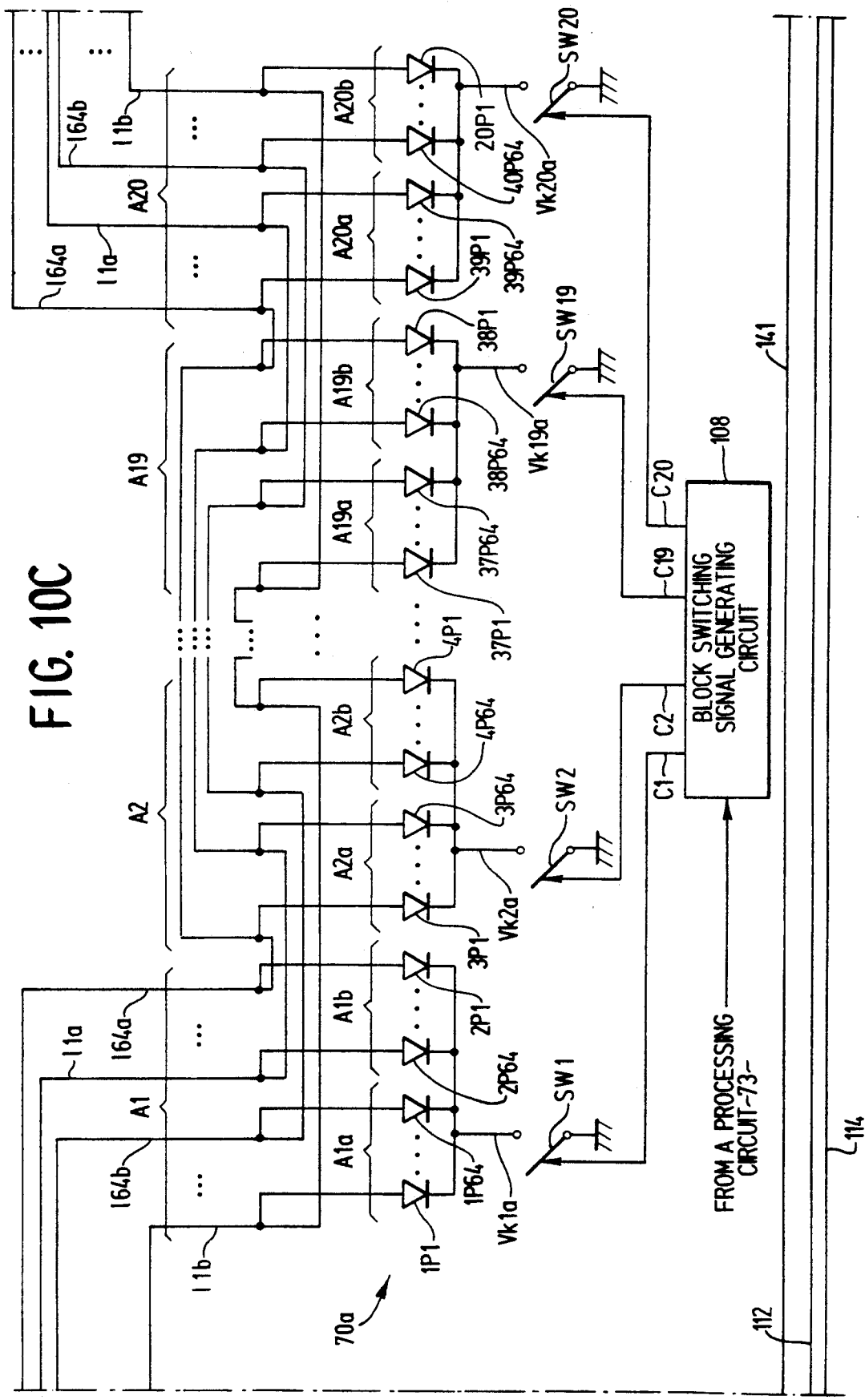
Figure 10D:
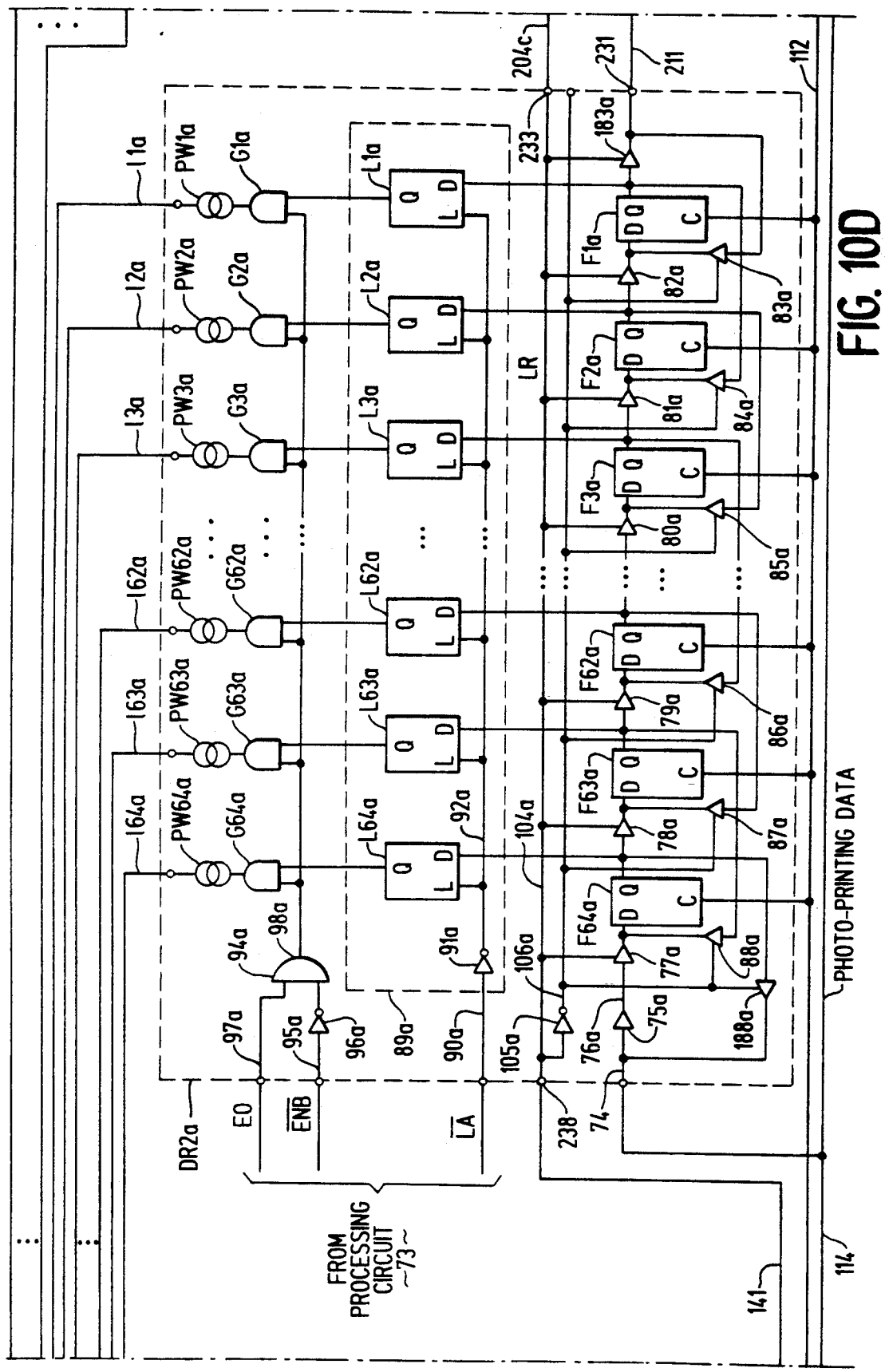
Figure 10E:
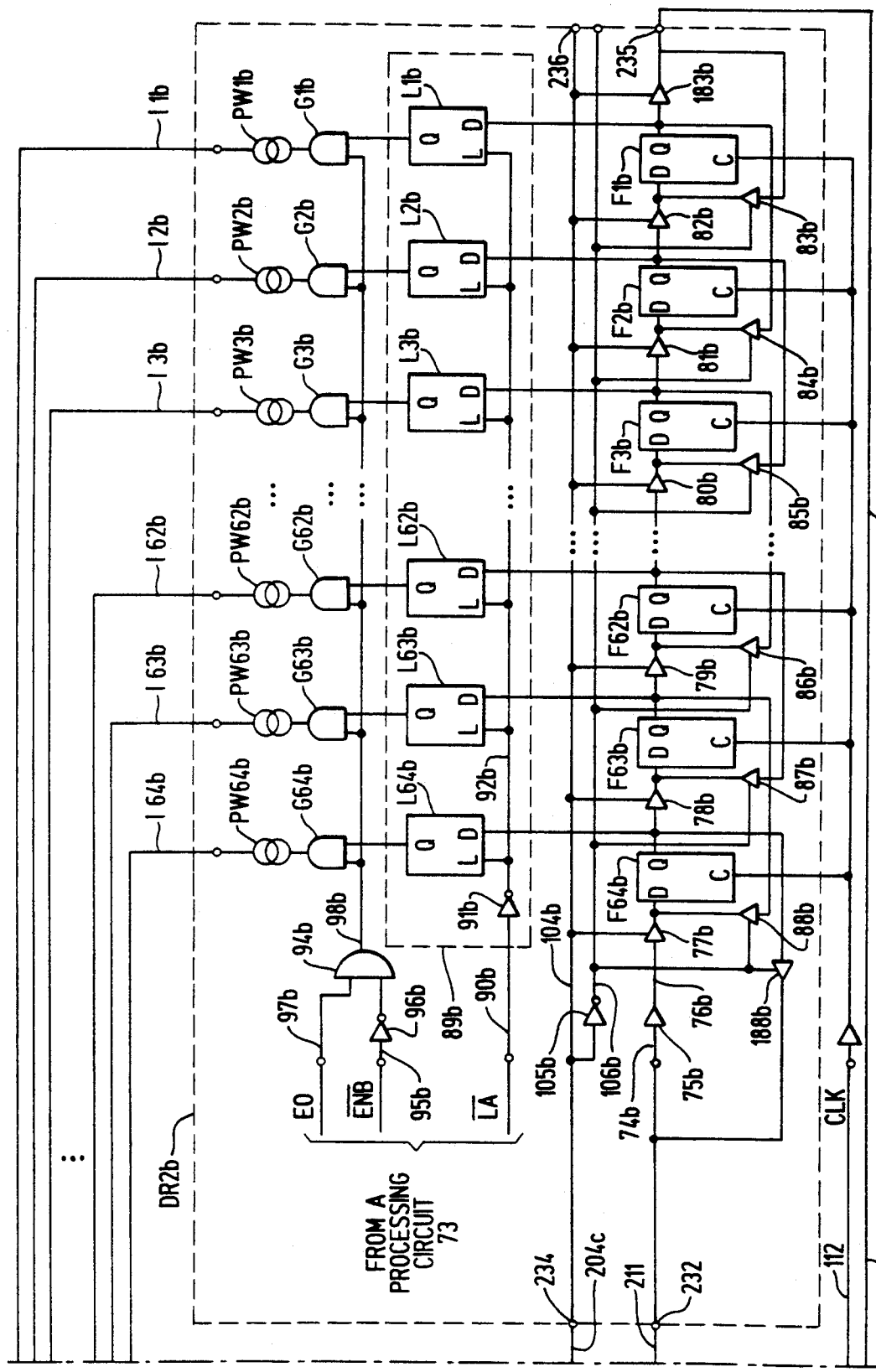

FIG. 10 is a diagram showing the detailed configuration of each of the driving means DR1a, DR1b and DR2a, DR2b. These driving means DR1a, DR1b and DR2a, DR2b are similar to the previously described driving means DR1, and like reference numerals are used to designate corresponding parts, the numerals being suffixed with a character "a" or "b" where necessary. In the driving means DR1a and DR1b of this embodiment, the corresponding lines 104a and 104b are interconnected by the line 104c via the terminals 133 and 134, and the output of the flip-flop F1a in the driving means DR1a is supplied to the input of the flip-flop F64b in the driving means DR1b via the switching element 183a, the lines 111 and 74b, the terminals 131 and 132, the buffer 75b, and the first switching element 77b. Further, the printing data from the line 74 is transferred via the line 114 and is supplied to the flip-flop F1b in the driving means DR1b via the terminal 135 and the second switching element 83b. The output of the flip-flop F64b in the driving means DR1b is transferred via the switching element 188b, the line 111, and the terminals 132 and 131, and is supplied to the flip-flop F1a in the driving means DR1a via the second switching element 83a.

Furthermore, the switching signal transferred via the line 104a in the driving means DR1a is input to the line 104b in the driving means DR1b via the line 104c and the terminals 133 and 134.

The driving means DR2a and DR2b disposed opposite to the driving means DR1a and DR1b across the printing means 70 have the same configuration as that of the previously described driving means DR1a and DR1b, and like reference numerals are used to designate corresponding parts. It should be noted that the inverted switching signal on the line 106b in the driving means DR1b is supplied from an output terminal 137 thereof through a line 141 to a line 104a in the driving means DR2a. The inverted switching signal input to the line 104a is further transferred through an output terminal 233 of the driving means DR2a and through an line 204c to an input terminal 234 of the driving means DR2b. The printing data in the flip-flop F1a in the driving means DR2a is transferred through the switching element 183a, the terminal 231, and the line 211 to an input terminal 232 of the driving means DR2b. The printing data from the line 114 is supplied to the flip-flop F1b via the terminal 235 and the switching element 83b of the driving means DR2b. The number of the driving means DR1a, DR1b and DR2a, DR2b respectively disposed at both ends of the printing means 70 may be increased to three or more. In that case, the switching signal should be supplied to an output terminal 136 of the driving means DR1b, and the inverted switching signal from an output terminal 236 of the driving means DR2b should be supplied, respectively.

When the switching signal from the output terminal 137 of the driving means DR1b is applied to the input terminal 238 of the driving means DR2a via the line 141, the storing direction, or transfer direction, of printing data in the driving means DR1a and DR1b becomes opposite to the storing direction, or transfer direction, of printing data in the driving means DR2a and DR2b.

FIG. 11 shows waveforms to explain the operation of the embodiment illustrated in FIGS. 9 and 10. The operation of this embodiment is similar to that of the foregoing embodiment illustrated in FIGS. 1 to 7. When the processing circuit 73 is initialized, the enabling signal $\overline{ENB}$ goes high and the output Q of the switching signal generating source 100 goes high, causing the switching signal shown in FIG. 11(b) to be derived at the line 104 and given to the driving means DR1a and DR1b. When the latch signal $\overline{LA}$ is input to the switching signal generating source 100, the switching signal changes between high and low with each input, which is derived at the line 104a. When the line 104a is at a high level, the first switch elements 77a-82a conduct and the second switch elements 83a-88a shut off. The same goes with the other driving means DR1b. The switching signal is inverted by the inverting circuit 105b in the driving means DR1b, and is supplied from the output terminal 137 through the line 141 to the input terminal 238 of the driving means DR2a, as previously noted. In the driving means DR2a, the inverted switching signal which is at a low level is further inverted by the inverting circuit 105 to change to a high level, causing the second switching elements 83a-88a to conduct and the switching elements 77a-82a and 183a to shut off. The other driving means DR2b operates in the same manner as the driving means DR2a. In the driving means DR1a and DR1b, the printing data for a total of 128 light emitting diodes in the block A1 are derived from the processing circuit 73 to the line 74 and are stored, in synchronism with the clock signal CLK shown in FIG. 11(d), in the flip-flops F1b-F64b and F1a–F64a sequentially in the arrayed direction thereof, i.e. from left to right in FIG. 9. Thereafter, the latch signal $\overline{LA}$ shown in FIG. 11(e) is given to transfer the contents stored in the flip-flops F1a–F64a and F1b–F64b to the latch circuits L1a–L64a and L1b–L64b for latching therein.

As previously noted, since the inverted switching signal is applied to the driving means DR2a and DR2b through the line 106b of the driving means DR1b, the storing direction of the printing data in the driving means DR2a and DR2b is opposite to that in the driving means DR1a and DR1b. The block switching signal generating source 108 applies the low level signal shown in FIG. 11(f) to the switch SW1 for the common signal line VK1 for the duration of the energizing period W1 in order to energize the switch SW1 for the period W1. The total of 128 light emitting diodes are thus energized corresponding to the printing data. During the period in which the light emitting diodes in the block A1 are energized, the printing data for the next block A2 are generated from the processing circuit 73. At this time, a low level signal is derived from the switching signal generating source 100 to the line 104a, and the inverted signal from the line 106a causes the second switching elements 83a–88a and 83b–88b to conduct and the first switching elements 77a–82a and 77b–82b to shut off in the driving means DR1a and DR1b, so that the printing data sequentially generated from the processing circuit 73 to the right in FIG. 9 toward the light emitting diodes contained in the block A2 are stored in the flip-flops F1a–F64a and F1b–F64b in the reverse direction indicated by T2a, the light emitting diodes in the block A2 being driven at the next timing. The switches SW2 and SW3 are controlled in response to the signals shown in FIG. 11(g) and FIG. 11(h). This enables, for example, the light emitting diode 1P1 contained in the block part A1a of the block A1 to be driven not only by the driving means DR1b but also by the corresponding driving means DR2a. Each of the light emitting diodes of the printing means 70 can thus be driven simultaneously by the driving means DR1a, DR1b and DR2a, DR2b respectively disposed at the left and right ends of the array of the light emitting diodes, making it possible to increase the driving current and thereby increase the printing speed. Also, since the driving means DR1a, DR1b and DR2a, DR2b each have fundamentally the same configuration, production efficiency can be enhanced.

In the above embodiment illustrated in FIGS. 9 to 11, the blocks A1–A20 respectively include a plurality of block parts A1a, A1b; ...; A20a, A20b, each block part having a plurality of light emitting diodes, and printing data is transferred block by block for each block A1–A20 to be driven, thus serving to further increase the total printing speed. The printing data can be derived from the processing circuit, for example, at 10 MHz, which means that the time required for transfer of data for the 128 light emitting diodes is 12.8 μsec (=128 dots/10 MHz). Therefore, if the time W1 required for energization is 22 μsec, for example, the transfer can be made within the period W1.

The invention can be embodied not only in connection with light emitting diode heads but also in connection with heating resistors of a thermal head and further in connection with printing elements of other configurations.

The driving means DR1a, DR1b and DR2a, DR2b may be configured differently than described above.

Figure 12:
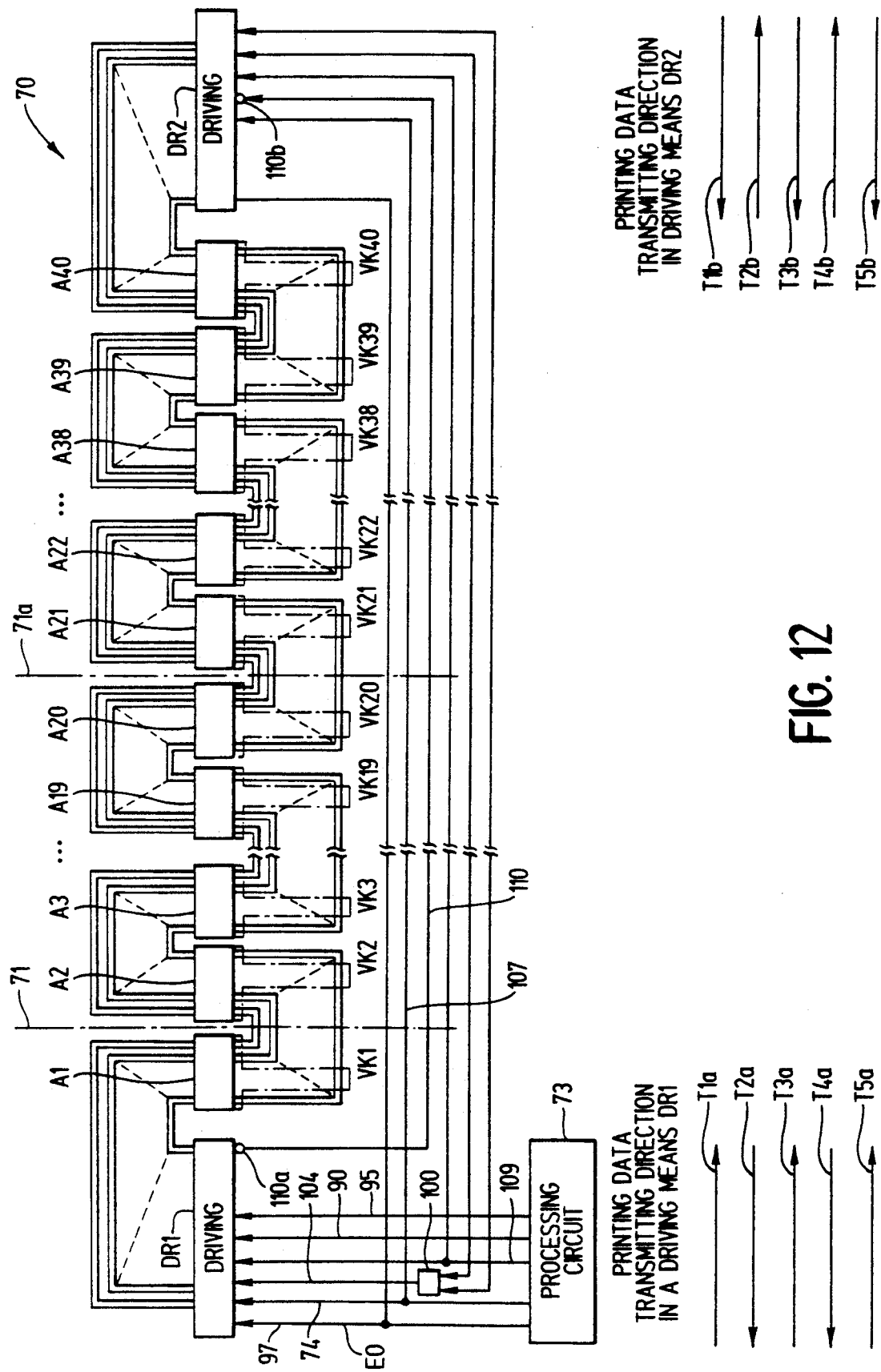
FIG. 12 is a simplified block diagram of still further embodiment of the invention.

FIG. 12 is a simplified general block diagram of still further embodiment of the invention. The image forming apparatus of this embodiment is provided with a light emitting diode head or printing means 70a which has a plurality (40 in this embodiment) of blocks A1–A40 arrayed in a row in the horizontal direction in FIG. 12 and exposes a photosensitized material being transported in the direction orthogonal to the arrayed direction of the blocks (in the vertical direction in FIG. 12), to form an image on the photosensitized material. A pair of driving means DR1 and DR2 are respectively disposed at both ends of the array of the blocks A1–A40 in the arrayed direction thereof. A switching signal generated from a switching signal generating source 100 is applied to the driving means DR1 via a line 104, the driving means DR1 having an output terminal 110a from which an inverted switching signal created by inverting the switching signal is derived. The inverted switching signal is transferred via a line 110 to an input terminal 110b of the other driving means DR2. Control signals and printing signals from the processing circuit 73 are supplied to the driving means DR1 and DR2. The light emitting diodes contained in the blocks are sequentially energized and driven block by block.

Figure 13:
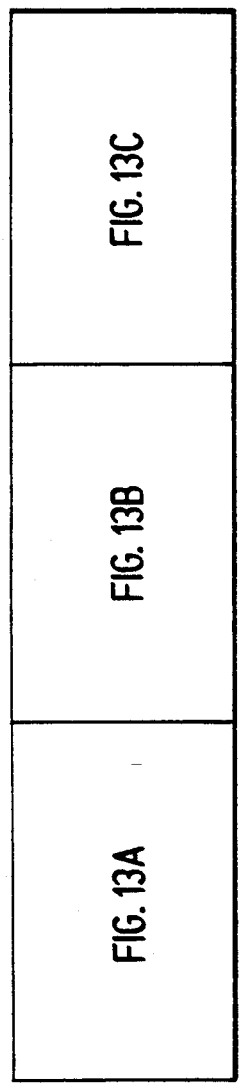
FIG. 13 is a general diagram to explain the detailed electrical configuration of the embodiment.
Figure 13A:
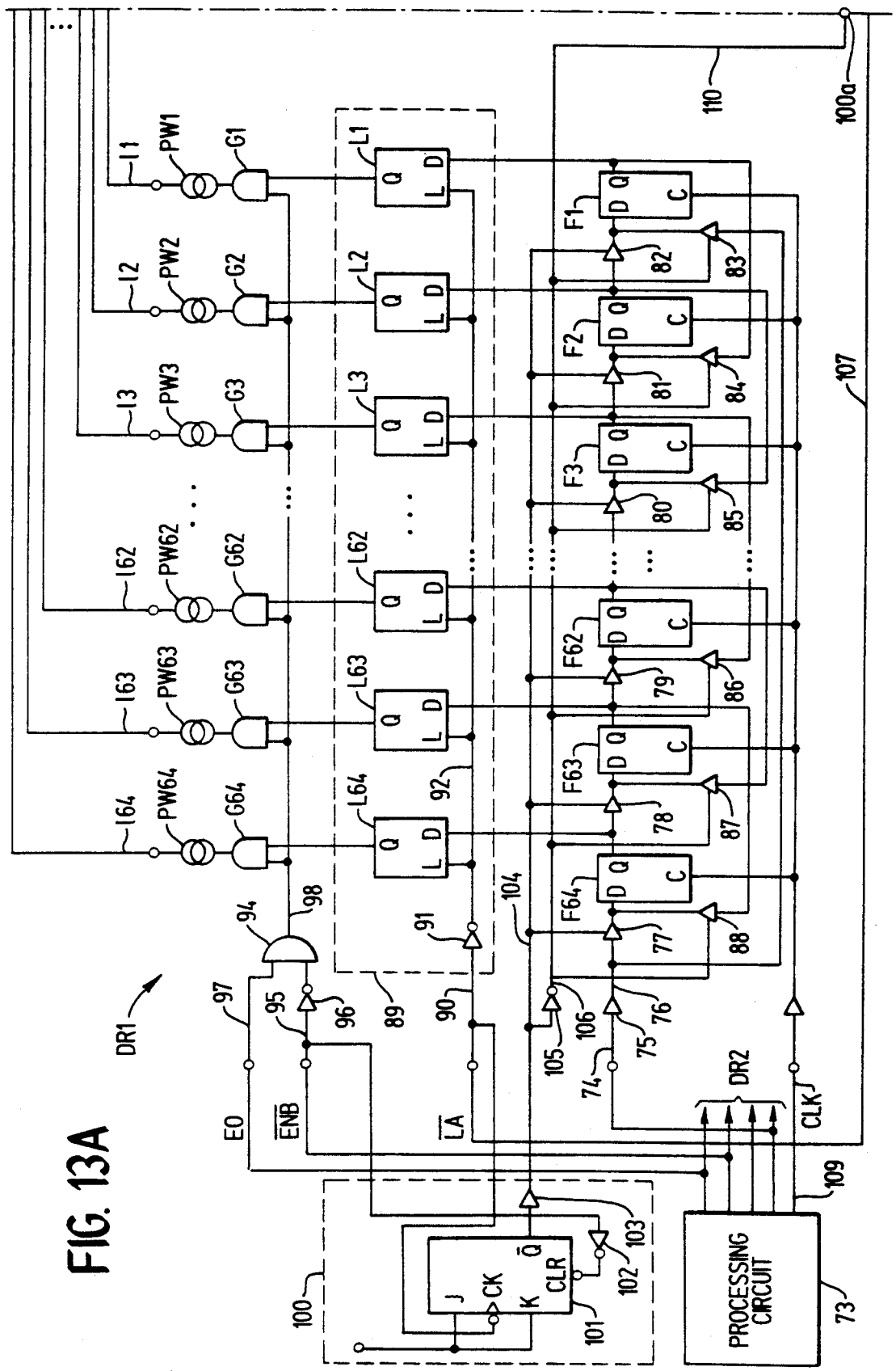
FIG. 13A is a block diagram showing the detailed configuration of a portion of the embodiment, FIG. 13B a block diagram showing the detailed configuration of another portion thereof, and FIG. 13C a block diagram showing still another portion thereof.
Figure 13B:
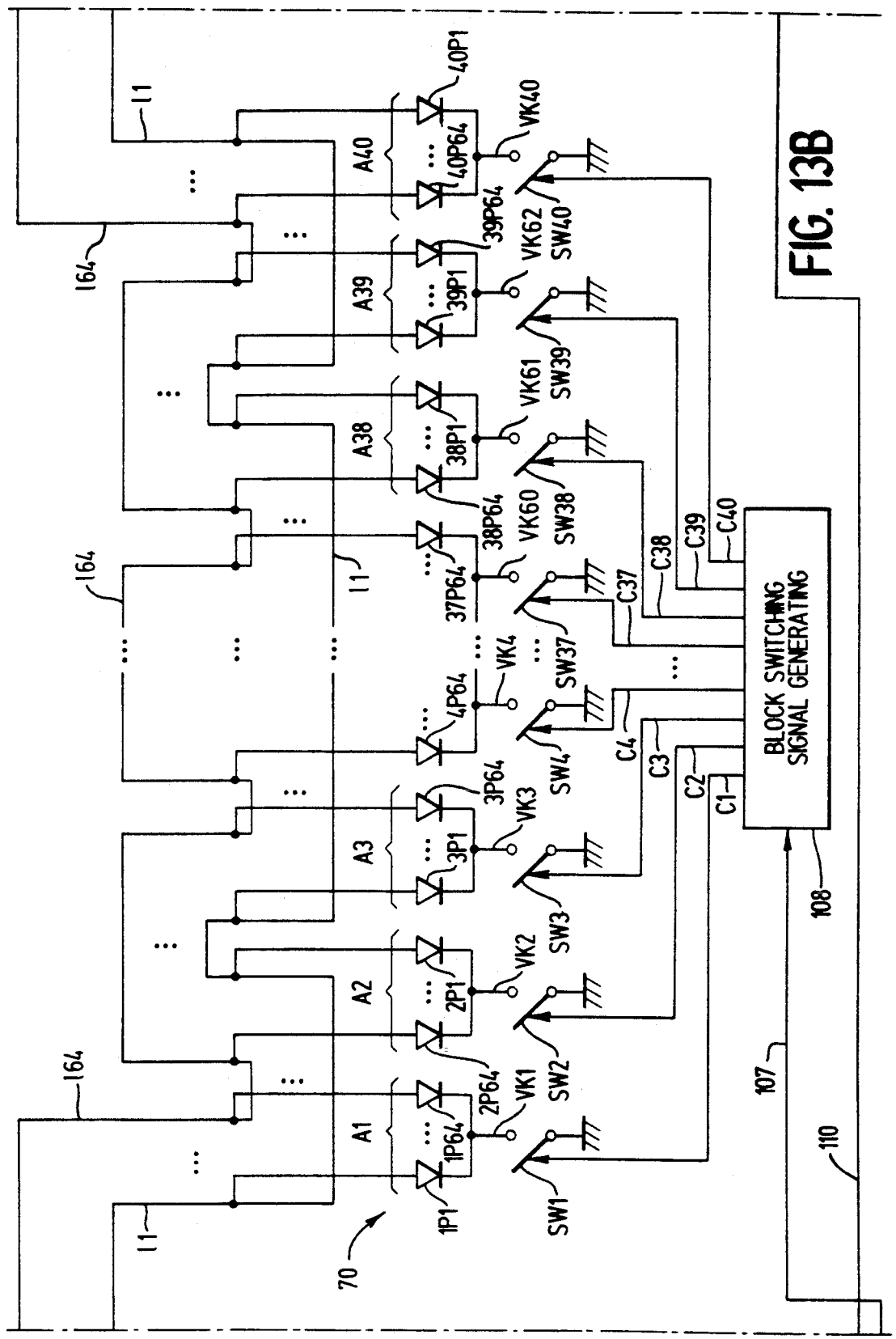
Figure 13C:
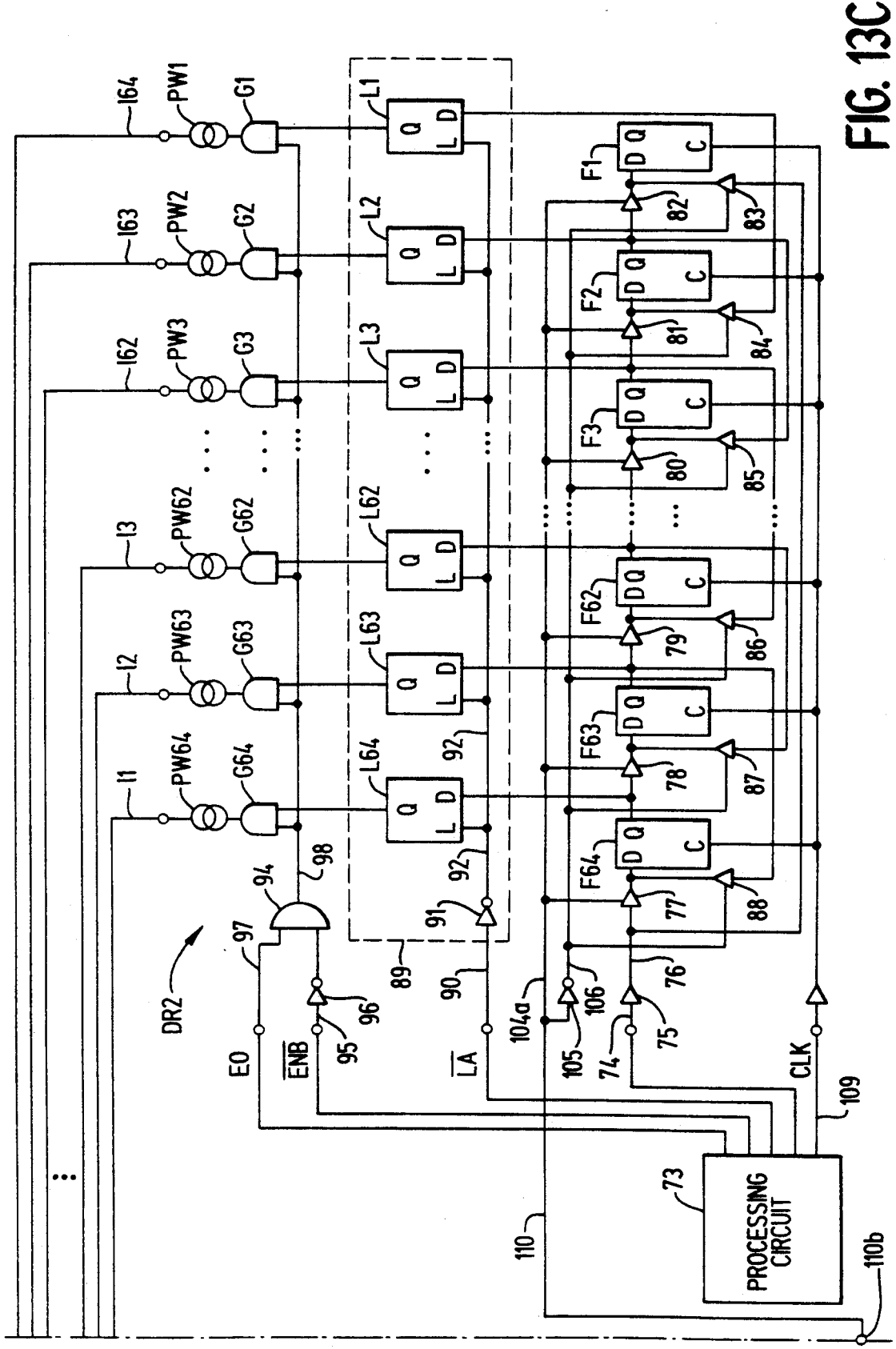

FIG. 13 is a block diagram showing the detailed configuration of the embodiment including the driving means DR1 and DR2. The blocks A1–A40 respectively contain light emitting diodes 1P1–1P64; ...; 40P1–40P64, each block A1–A64 thus containing a total of 64 light emitting diodes.

Figure 14:
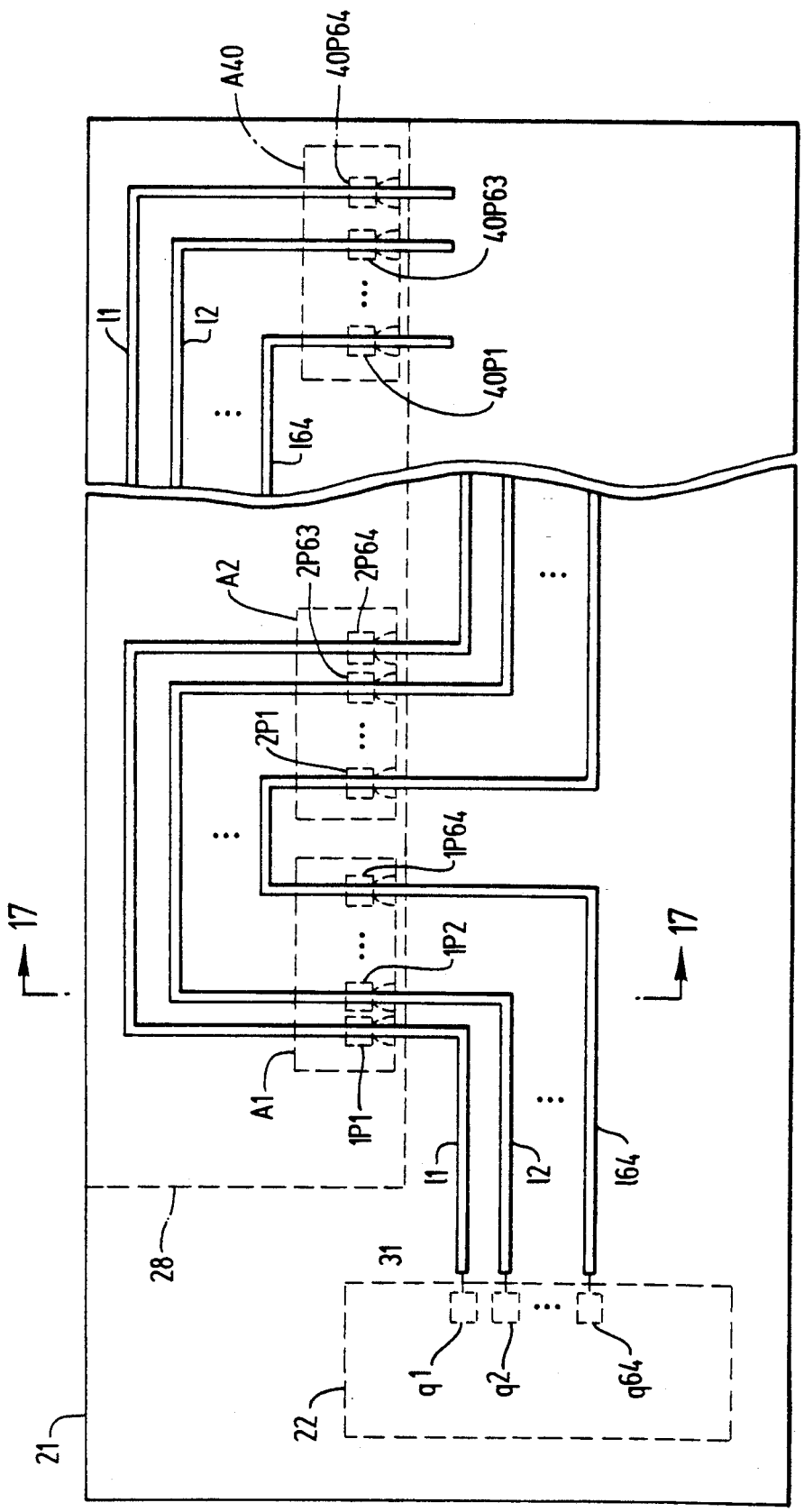
FIG. 14 is a simplified plan view of printing means 70.

FIG. 14 is a simplified plan view of the printing means 70a. One terminal of each of the light emitting diodes contained in the blocks A1–A40 is connected to one of individual signal lines 11–164.

Figure 15:
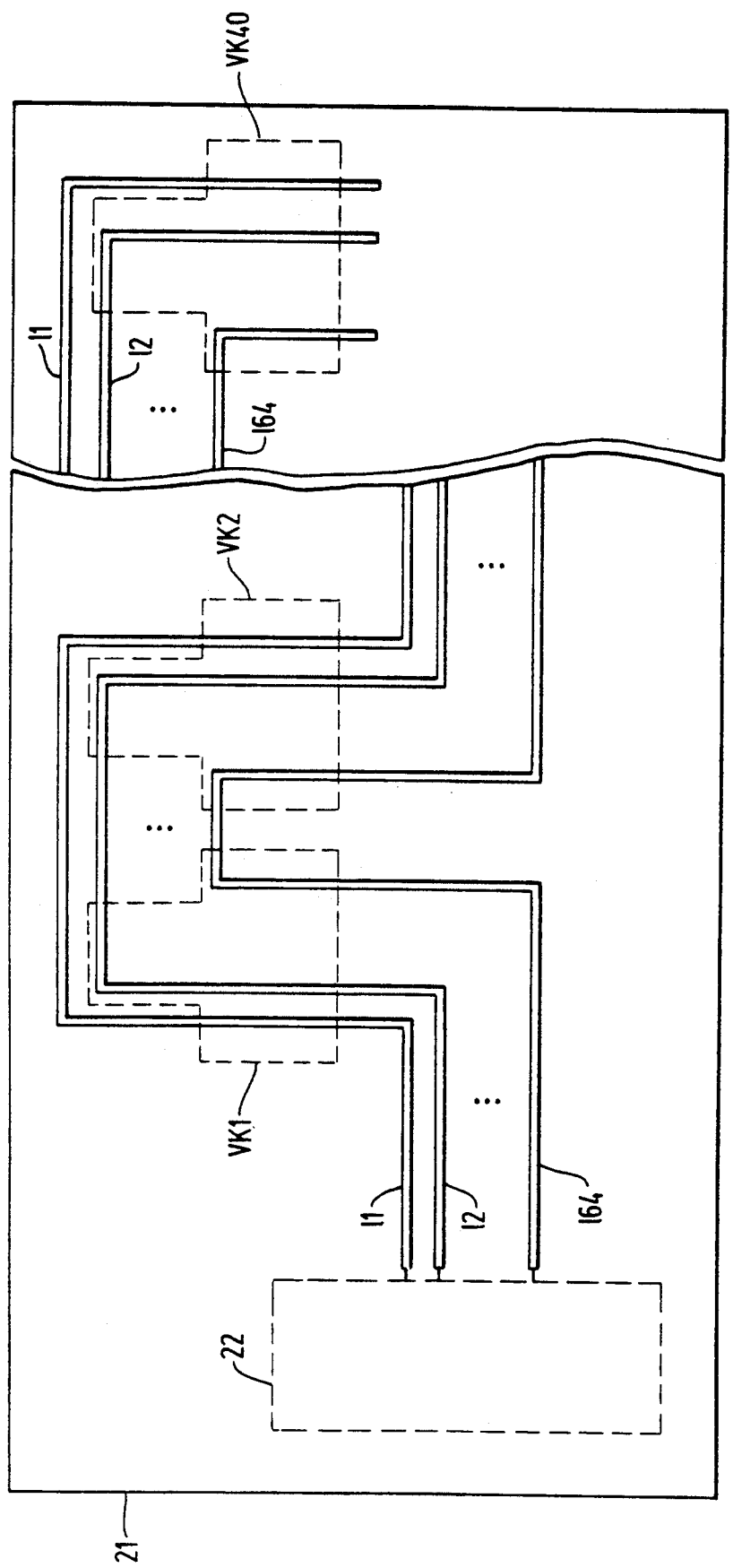
FIG. 15 is another simplified plan view of the printing means 70.

FIG. 15 is another simplified plan view of the printing means 70a. The other terminal of each of the light emitting diodes contained in the blocks A1–A40 is connected to one of common signal lines VK1–VK40 respectively provided for the blocks A1–A40.

Figure 16:
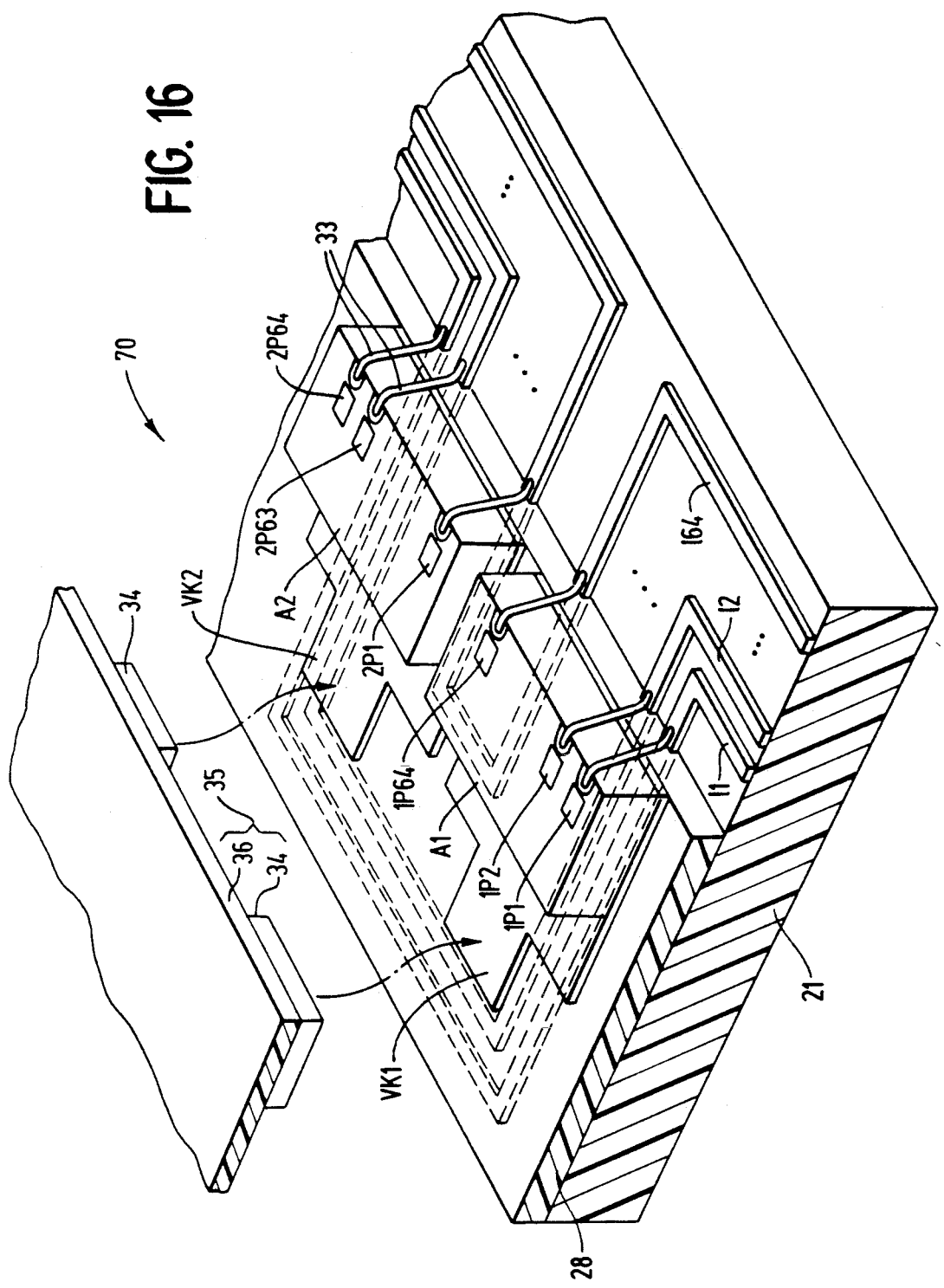
FIG. 16 is a perspective view showing a portion of the printing means.

FIG. 16 is a perspective view of a portion of the printing means 70a, and FIG. 17 shows a cross section taken along line 17—17 in FIG. 14. A substrate 21 is formed from an electrical insulating material such as ceramic or glass, on the surface of which the individual signal lines 11–164 are formed in a zigzag or cranked arrangement. The individual signal lines 11–164 are respectively connected to one terminal of each of the light emitting diodes disposed at symmetric positions on adjacent blocks, such pairs of light emitting diodes including, for example, 1p1/2p64 and 1p2/2p63 disposed at symmetric positions on A1 and A2 with respect to the plane of symmetry 71a (see FIG. 13). Further, the printing means 70a is so constructed that the first 20 blocks A1–A20 are disposed symmetrically to the last 20 blocks A21–A40 with respect to the plane of symmetry 71a.

The substrate 21 has an electrical insulating layer 28 formed thereon partially covering the individual signal lines 11–164, and the common signal lines VK1–VK40 are formed on the electrical insulating layer 28. The other terminals of the light emitting diodes 1P1–1P64,; ...; 40P1–40P64 in the blocks A1–A40 are connected in common on a block-by-block basis to the respective common signal lines VK1–VK40.

As is apparent from FIG. 17, the light emitting diode 1P2 and the individual signal line 12 are interconnected by a bonding wire 33. The other light emitting diodes are also configured in the same manner.

Each of the common signal line VK1-VK40 is electrically connected as shown in FIG. 17, to a conductor 34 formed on one surface of a flexible film 36. Conductors 34 and film 36 form a flat cable 35.

Referring back to FIG. 13, the driving means DR1 for driving the printing means 70a is disposed on the substrate 21 and, based on sequential printing data supplied from the processing circuit 73, the driving means DR1 drives the light emitting diodes 1P1-1P64; ... ; 40P1-40P64 of the printing means 70a block by block in the sequence in which the blocks are arrayed, that is, from left to right in FIG. 12.

The driving means DR1 includes D-type flip-flops F1-F64 which are storage elements individually corresponding to the light emitting diodes in each block A1-40. Printing data $\overline{DA}$ supplied from the processing circuit 73 via a line 74 is passed through a buffer 75 and a line 76 and is given to an input terminal of the first stage flip-flop F64 via a first switching element 77. An output Q of the flip-flop F64 is supplied to a first switching element 78 through which it is given to the flip-flop F63 at the next stage. The same goes with the other first switching elements 79-82.

The printing data supplied via the line 76 is also given to an input terminal of the last-stage flip-flop F1 through a second switching element 83, the output Q of the last-stage flip-flop F1 then being given to an input of the storage element F2 at the preceding stage via a second switching element 84. The same goes with the other second switching elements 85-88.

The outputs of the flip-flops F1-F64 are respectively supplied to the inputs of D-type flip-flops L1-L64 included in a latch circuit 89. The flip-flops L1-L64 perform latching when a latch signal $\overline{LA}$ given from the processing circuit 73 to a line 90 is supplied via an inverting circuit 91 and a line 92. The output of each flip-flop L1-L64 in the latch circuit 89 is supplied to one input of its corresponding AND gate G1-G64, and the outputs of the AND gates G1-G64 are respectively supplied to current sources PW1-PW64. The current sources PW1-PW164 supply current using the individual signal lines 11-1164 as the other potential, thus supplying power to drive the light emitting diodes.

An enabling signal $\overline{ENB}$ is supplied from the processing circuit 73 to an AND gate 94 via a line 95 and an inverting circuit 96. A signal EO which goes high at power on is also supplied from the processing circuit 73 to the AND gate 94 via a line 97. The output of the AND gate 94 is supplied via a line 98 to the other input of each AND gate G1-G64.

A switching signal generating source 100 includes a J-K flip-flop 101 the truth table for which is shown in Table 1.

TABLE 1

| CLR | CK | J | K | Q |
|-----|----|----|----|----|
| L | x | x | x | H |
| H | | H | H | Toggle |

The input terminals J and K of the flip-flop 101a are connected to the power source and are normally at a high level. The enabling signal $\overline{ENB}$ is given to the clear input terminal CLK via an inverting circuit 102 through a line 95, while the latch signal $\overline{LA}$ is input to the clock input terminal CK. The output from the output terminal $\overline{Q}$ is supplied as a switching signal from a buffer 103 to the first switching elements 77-82 via the line 104, the switching elements 77-82 being made to conduct by a high level signal from the line 104 and to shut off by a low level signal therefrom. The switching signal from the buffer 103 is inverted by an inverting circuit 105, and the thus inverted signal is given as the other switching signal to the second switching elements 83-88 via the line 106. The second switching elements 83-88 are made to conduct when the inverted switching signal from the line 106 is high, and shut off when it is low. In the driving means DR1b, the switching signal from the line 104 is inverted and derives the inverted switching signal at an output terminal 110a, and the inverted switching signal derived at the output terminal 110a is applied via a line 110 to an input terminal 110b of the other driving means DR2. Thus, the two driving means DR1 and DR2 store and derive the printing data, with the data transfer directions reversed from each other, the transfer directions indicated by the reference numerals T1a-T5a and T1b-T5b, respectively.

The light emitting diodes in the blocks A1-A40 are connected block by block to corresponding switches SW1-SW40 via the respective common signal lines VK1-VK40, and each switch SW1-SW40 is connected to the ground potential. The latch signal $\overline{LA}$ is given to a block switching circuit 108 via a line 107. In response to the latch signal $\overline{LA}$, the block switching circuit 108 supplies a block switching signal to the switches SW1-SW40 via lines C1-C40, thereby sequentially activating the switches SW1-SW40 for the blocks A1-A40 one at a time.

The operations of the printing means 70a and the driving means DR1a and DR1b are now described with reference to FIG. 18. To initiate an image forming operation, the processing circuit 73 applies a high level signal to the line 97, while the enabling signal $\overline{ENB}$ is caused to turn from high to low, as shown in FIG. 18(a), which in turn causes the signal derived from the AND gate 94 to the line 98 to go high. Also, when the enabling signal $\overline{ENB}$ is at a high level, the signal is inverted to a low level by the inverting circuit 102 to clear the flip-flop 101 in the switching signal generating source 100, causing the output $\overline{Q}$ thereof to go high. In these circumstances, the flip-flop 101 is enabled to receive the latch signal $\overline{LA}$ at the clock input terminal CK. The waveform of the output $\overline{Q}$ of the flip-flop 101, and thus the waveform of the line 104, is shown in FIG. 18(b). With the output $\overline{Q}$ at a high level, the first switching elements 77-82 stay in a conducting state. Thus, when 64 items of printing data $\overline{DA}$ are sequentially derived from the processing circuit 73 to the line 74 in serial bits as shown in FIG. 18(c), the flip-flops F1-F64 operating in synchronism with the clock signal CLK shown in FIG. 18(d) derived from the processing circuit 73 via the line 109 store the data for the light emitting diodes for one block, i.e. for a total of 64 bits, in the sequence from the flip-flop F64 to the flip-flop F1, the data being transferred from left to right in FIG. 12. After the data for one block have thus been transferred, the latch signal $\overline{LA}$ shown in FIG. 18(e) is given from the processing circuit 73, causing the printing data stored in the flip-flops F1-F64 to be transferred in parallel to the flip-flop L1-L64 in the latch circuit 89 for latching therein.

the latch signal $\overline{LA}$ is given to the clock input terminal CK of the flip-flop 101 in the switching signal generating source 100, and the output $\overline{Q}$ changes from a high to a low level at the falling edge of the latch signal $\overline{LA}$. This causes the first switching elements 77-82 to shut off and the second switching elements 83-88 to conduct, changing the flip-flops F1-F64 to a state enabled for inputs in the sequence from right to left in FIG. 12. Responding to the latch signal $\overline{LA}$, the block switching circuit 108 supplies the block switching signal shown in FIG. 7(f) to the switch SW1 via the line C1, thereby causing the switch SW1 to stay in a conducting state during the low period W1 of the line C1. Thus, the light emitting diodes 1P1-1P64 contained in the first block A1 are energized by the current from the current sources PW1-PW64, and illuminate to perform printing. During the period W1 in which the switch SW1 is in a conducting state, the printing data $\overline{DA}$ for the second block A2 is derived from the processing circuit 73 to the line 74 and is stored in the flip-flops F1-F64 in this order, via the second switching elements 83-88. The printing data for the light emitting diode 2P1 in the second block A2 is stored in the flip-flop F1, while the printing data for the light emitting diode 2P64 is stored in the flip-flop F64. Then, when the latch signal $\overline{LA}$ is issued, the block switching signal generating circuit 108 derives a low level signal shown in FIG. 18(g) to cause the switch SW2 to conduct, thus energizing the light emitting diodes 2P1-2P64 in the second block A2 in accordance with the outputs from the latch circuit 89. Thus, during the period in which the light emitting diodes 1P1-1P64 are energized, the printing data for the light emitting diodes 2P1-2P64 in the second block A2 are stored in the flip-flops F1-F64. The above operation is repeated to sequentially drive the light emitting diodes in all blocks A1-A40. FIG. 18(h) shows a signal supplied from the line C3 for the block A3 to the switch SW3 to drive the switch SW3.

The switching signal from the line 104 in the driving means DR1 is inverted by the inverting circuit 105, and the inverted switching signal is derived at the output terminal 110a and is applied to the input terminal 110b of the other driving means DR2 via the line 110. The driving means DR1 and DR2 operate in the same manner except that the data transfer direction is reversed. The driving means DR2 has a similar configuration to that of the driving means DR1 described, and like numerals are used to designate corresponding parts. The inverted switching signal via the line 106 in the driving means DR1 is given via the line 110 to the line 104a in the driving means DR2. In the driving means DR2, parts corresponding to those in the driving means DR1 may be designated by like numerals suffixed with a character "a". The flip-flops F1-F64 in the driving means DR1 correspond to the individual signal lines l1-l64 respectively, while the flip-flops F1-F64 in the driving means DR2 correspond to the individual signal lines l64-l1 respectively. Since, in the driving means DR2, the inverted switching signal from the driving means DR1 is given via the line 110 to the line 104, the printing data corresponding to the light emitting diodes in the blocks A1-A40 are stored in the flip-flops F1-F64 in the driving means DR1 and in the flip-flops F1-F64 in the driving means DR2 with the storing direction opposite from each other. This allows the driving means DR1 and DR2 to simultaneously drive the same light emitting diode in any block A1-A40. For example, when the light emitting diode 1P1 in the block A1 is energized via the individual signal line l1 on the basis of the output of the flip-flop F1 in the driving means DR1, power for the light emitting diode 1P1 is supplied to the line l1 on the basis of the output of the flip-flop F64 in the other driving means DR2. Since the light emitting diode 1P1 is driven by the two driving means DR1 and DR2, a large current can be supplied to the light emitting diode 1P1 and therefore, the light output can be increased. The same goes with the other light emitting diodes. By increasing the light output of each light emitting diode, the energizing time W1 (see FIG. 18(f) to FIG. 18(h)) can be reduced, thus increasing the printing speed.

The invention can be embodied not only in connection with light emitting diode heads but also in connection with heating resistors of a thermal head and further in connection with printing elements of other configurations.

The driving means DR1, DR2, etc. may be configured differently than described above.

The invention may be embodied in other specific forms without departing from the spirit or essence characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image forming apparatus comprising:
    printing means for forming an image on a recording medium, said printing means having an array of printing blocks, said array having two opposed ends, and a plurality of individual signal lines, wherein
        each of the blocks contains a common signal line and a plurality of printing elements arranged in an order in a row, each of the printing elements having first terminals and second terminals, and said common signal line being connected to said second terminals of all of said printing elements, and
        each of said individual signal lines is connected to one of said first terminals of one of the printing elements of each of the blocks such that the printing elements connected to one signal line are disposed at symmetric positions on adjacent printing blocks;
    a data generating source for sequentially generating printing data for said printing means in a sequence corresponding to the order of the printing elements of each of the blocks;
    block selecting means connected between said data generating source and said common signal lines for selecting each of the blocks in sequence;
    first driving means and second driving means each for providing drive signals to all of the printing elements of each of the blocks, each disposed at a respective end of said array of printing blocks, and having at least one data input, said data input of said first driving means and said data input of said second driving means being connected together and being connected to said data generating source for providing drive signals simultaneously to all of the printing elements of each of the blocks, wherein
        both of said driving means have outputs connected to all of said individual signal lines so that both of said driving means simultaneously supply power to selected printing elements of one of said blocks in response to the printing data generated by said data generating means when said one of said blocks is selected by said block selecting means; and a switching signal generating source for generating a switching signal having a value switched between a first value and a second value which is opposite to the first value, and wherein each said driving means comprises a plurality of data storage elements, and switchable connecting means connecting said data storage elements to one another for transmitting data supplied by said data generating source from one of said data storage elements to another, said switchable connecting means being operative for transmitting data from one of said storage elements to another in a first direction in response to the first value of the switching signal and in a second direction opposite to the first direction in response to the second value of the switching signal;

said switchable connecting means of said first driving means are connected to receive the switching signal from said switching signal generating source;

said first driving means further comprises means for producing a second switching signal having a value opposite to the value of the switching signal generated by said switching signal generating source; and said switchable connecting means of said second driving means are connected to receive the second switching signal produced by said means for producing a second switching signal.

2. Image forming apparatus as defined in claim 1 wherein each said first driving means and second driving means comprises two driving units; each of said driving units comprises a plurality of data storage elements, and connecting means connecting said storage elements to one another for transmitting the printing generated data by said data generating source from one storage element to another; each of said first driving means and second driving means further comprise further connecting means connected between said driving units for transmitting data in either one of two directions between said two driving units in response to a selecting signal; and said apparatus further comprises means for providing the selecting signal.

3. Image forming apparatus as defined in claim 1 wherein each said driving means comprises power sources for supplying power to selected printing elements of one of the blocks selected at a given time by said block selecting means.

4. Image forming apparatus as defined in claim 1 wherein each of said individual signal lines has first and second opposed ends, said first end of each of said individual signal lines is connected to said first driving means and said second end of each of said individual signal lines is connected to said second driving means.

* * * * *